US010913856B2

(12) United States Patent
Coppage et al.

(10) Patent No.: US 10,913,856 B2
(45) Date of Patent: Feb. 9, 2021

(54) GOLD NANOPARTICLE IN CERAMIC GLAZE

(71) Applicant: University of Richmond, Richmond, VA (US)

(72) Inventors: Ryan Coppage, Richmond, VA (US); Michael Leopold, Glen Allen, VA (US); Christine Lacy, Richmond, VA (US)

(73) Assignee: University of Richmond, Richmond, VA (US)

(*) Notice: Subject to any disclaimer, the term of this patent is extended or adjusted under 35 U.S.C. 154(b) by 371 days.

(21) Appl. No.: 15/790,717

(22) Filed: Oct. 23, 2017

(65) Prior Publication Data

US 2018/0112075 A1    Apr. 26, 2018

Related U.S. Application Data

(60) Provisional application No. 62/412,543, filed on Oct. 25, 2016.

(51) Int. Cl.
| | | |
|---|---|---|
| *C04B 33/34* | (2006.01) | |
| *C09C 1/00* | (2006.01) | |
| *C04B 41/00* | (2006.01) | |
| *C04B 41/86* | (2006.01) | |
| *C04B 41/50* | (2006.01) | |
| *C09C 1/62* | (2006.01) | |
| *C04B 33/04* | (2006.01) | |
| *C04B 33/14* | (2006.01) | |
| *C04B 111/82* | (2006.01) | |
| *C04B 111/00* | (2006.01) | |

(52) U.S. Cl.
CPC ............ *C09C 1/0009* (2013.01); *C04B 33/04* (2013.01); *C04B 33/14* (2013.01); *C04B 33/34* (2013.01); *C04B 41/009* (2013.01); *C04B 41/5022* (2013.01); *C04B 41/86* (2013.01); *C09C 1/62* (2013.01); *C01P 2004/04* (2013.01); *C01P 2004/51* (2013.01); *C01P 2004/64* (2013.01); *C04B 2111/00965* (2013.01); *C04B 2111/82* (2013.01)

(58) Field of Classification Search
CPC ......... C04B 33/04; C04B 33/14; C04B 33/34; C09C 1/0009
See application file for complete search history.

(56) References Cited

U.S. PATENT DOCUMENTS

| | | | | |
|---|---|---|---|---|
| 3,108,885 | A * | 10/1963 | Dunseth ................. | C03C 8/14 501/20 |
| 6,004,391 | A * | 12/1999 | Letschert ............. | C09C 1/0009 106/403 |
| 6,074,754 | A | 6/2000 | Jacobsen et al. ............. | 428/403 |
| 7,897,253 | B2 | 3/2011 | Fink-Petri et al. ........... | 428/325 |
| 2008/0026207 | A1 | 1/2008 | Fink-Petri et al. ........... | 428/328 |
| 2008/0145657 | A1 | 6/2008 | Igarashi et al. ............... | 428/402 |
| 2014/0076600 | A1 | 3/2014 | Browning et al. ............. | 174/50 |
| 2015/0307405 | A1 | 10/2015 | Huguet et al. .......... | C04B 35/64 |
| 2019/0112490 | A1 * | 4/2019 | Hayashi .................. | C09D 7/62 |

FOREIGN PATENT DOCUMENTS

WO     WO 2010/011841        1/2010      ......... H05K 3/12

OTHER PUBLICATIONS

Mestre et al "Synthesis of a red pigment from gold nanoparticles" Qualicer'12 Boletin de la Sociedad 2012, p. 1-12 (Year: 2012).*
Dargaud et al "A New Procedure for the Production of Red Gold Purples at the 'Manufacture Nationale de Ceramiques de Sevres'" Gold Bulletin 2007 40/4 p. 283-290 (Year: 2007).*
Frens et al "Controlled Nucleation for Regulation of the Particle Size in Monodisperse Gold Suspensions" Nature Phys. Sci, V241, (1973), 20-22. (Year: 1973).*
Blosi, M., Albonetti, S., Gatti, F., Baldi, G., and Dondi, M., "Au—Ag Nanoparticles as Red Pigment in Ceramic Inks for Digital Decoration," Dyes and Pigments 94, 355-362 (2012).
Cavalcante, P. M. T., Dondi, M., Guarini, G., Raimondo, M., and Baldi, G., "Colour Performance of Ceramic Nano-Pigments," Dyes Pigments 80, 226-232, 2009.
Musick, M. D., et al., "Metal Films Prepared by Stepwise Assembly. 2. Construction and Characterization of Colloidal Au and Ag Multilayers," Chem. Mater. 12, 2869-2881 (2000).
Adrienne R. Schmidt, et al., "Nanoparticle Film Assemblies as Platforms for Electrochemical Biosensing—Factors Affecting the Amperometric Signal Enhancement of Hydrogen Peroxide," Langmuir 29, 4574-4583 (2013).
Lambertson, Raef H., et al., "Gold Nanoparticle Colorants as Traditional Ceramic Glaze Alternatives," Journal of the American Ceramic Society, vol. 100, Issue 9, pp. 3943-3951, 2017.
International Search Report and Written Opinion for Application No. PCT/US17/57879, dated Jan. 8, 2018, 8 pp.
J. P. Malins, et al., "Reduction Processes in the Formation of Lustre Glazed Ceramics," Thermochrimica Acta., vol. 340-341, pp. 395-405, 1999.

(Continued)

*Primary Examiner* — Nathan H Empie
(74) *Attorney, Agent, or Firm* — Dawn-Marie Bey; Bey & Cotropia PLLC

(57) ABSTRACT

A range of processes is described herein for the preparation of a range of gold nanoparticle (Au NP) ceramic glazes with traditional firing methods that represents significant efficiency and ecological advancements over existing methods and allows for the replacement of commercial ceramic colorant methods, while retaining the costly equipment and firing methods already used. The process allows for ceramic surface color while breaking standards for minimal amounts of transition metal colorant used. The nanoparticle-based glazes described here add new colors to the known ceramic surface palette and offers greater consumer safety as an alternative to existing coloring processes that use higher concentrations of toxic metal and an increased risk of metal leaching from the final ceramic vessel into its contents (e.g., soil, beverage, food).

8 Claims, 24 Drawing Sheets
(19 of 24 Drawing Sheet(s) Filed in Color)

(56) References Cited

OTHER PUBLICATIONS

"Glossy Clear Liner" [online], FetishGhost's Secret Studio, Jun. 6, 2009 [retrieved on Nov. 30, 2017], Retrieved from the Internet: http://fetishghost.blogspot.co.nz/2009/06/glossy-clear-liner.html, 1 p.

D. J. Barber, et al., "An Investigation of the Origin of the Colour of the Lycurgus Cup by Analytical Transmission Electron Microscopy," Archaeometry, vol. 32, No. 1, pp. 33-45, 1990.

P. Colomban, "The Use of Metal Nanoparticles to Produce Yellow, Red and Iridescent Colour, From Bronze Age to Present Times in Lustre Pottery and Glass: Solid State Chemistry, Spectroscopy and Nanostructure," Journal of Nano Research, Trans Tech Publications, vol. 8, pp. 109-132, 2009.

P. Fermo, et al., "The Use of Nano-Particles to Produce Iridescent Metallic Effects on Ancient Ceramic Objects," Journal of Nanoscience and Nanotechnology, vol. 12, pp. 1-6, 2012.

\* cited by examiner

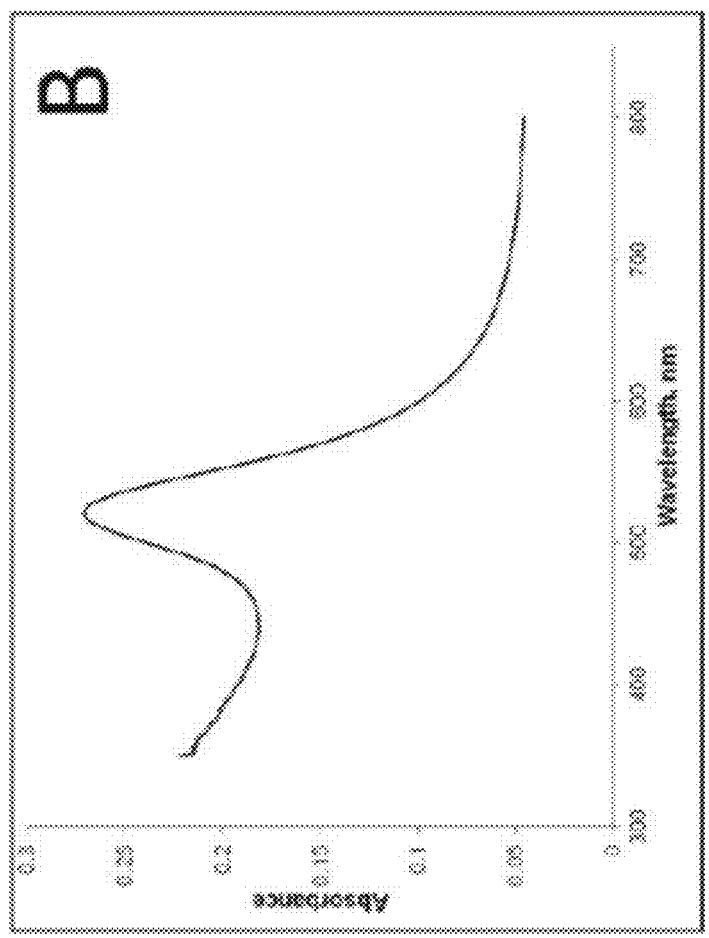
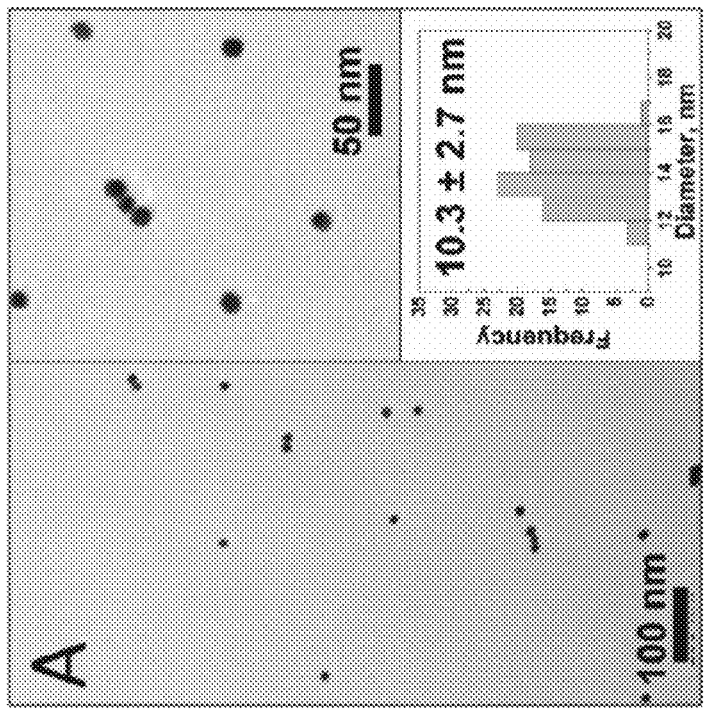
Figure 2a
Figure 2b

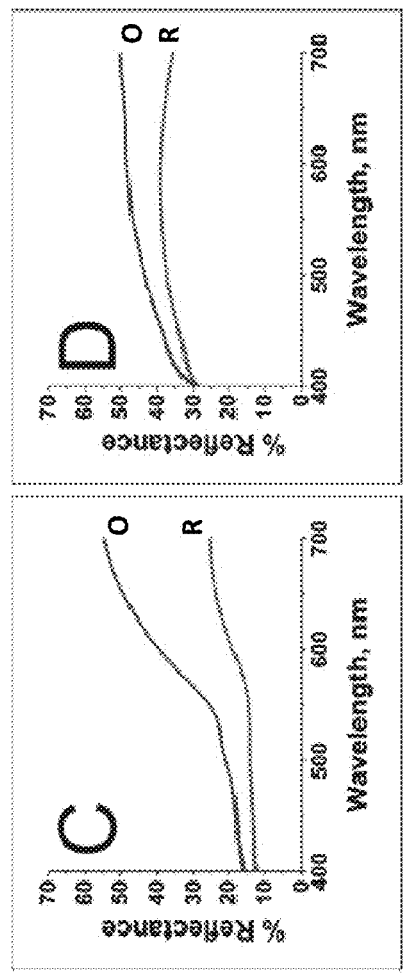
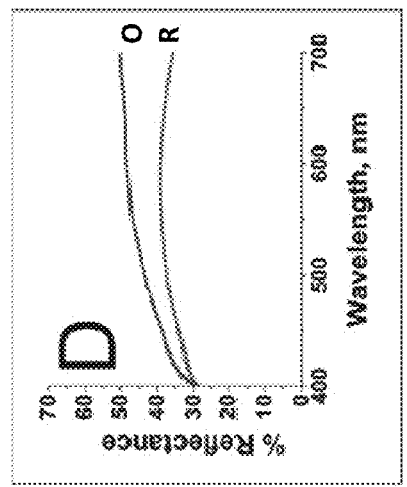
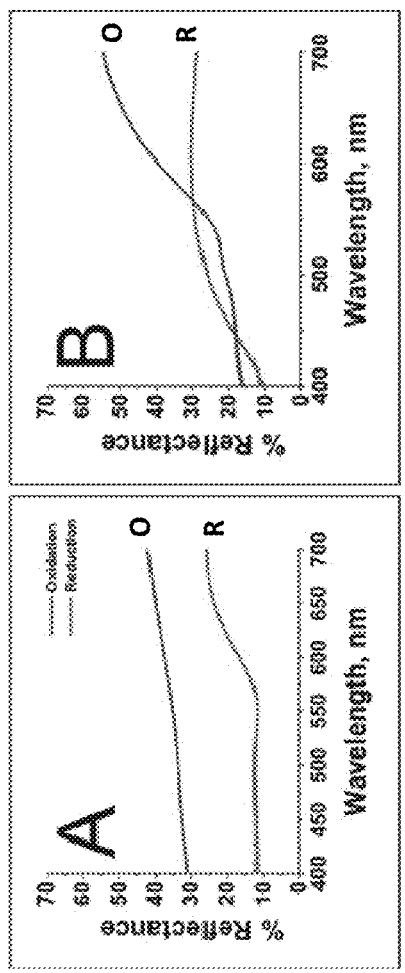
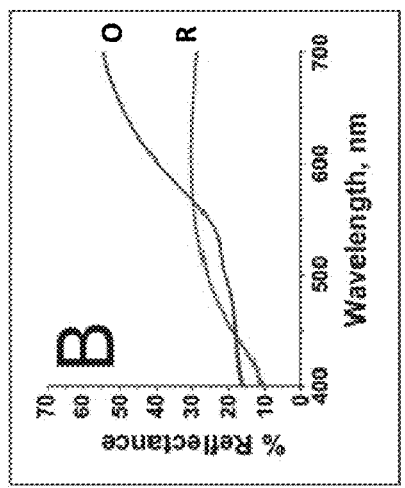
Figure 12a
Figure 12b
Figure 12c
Figure 12d

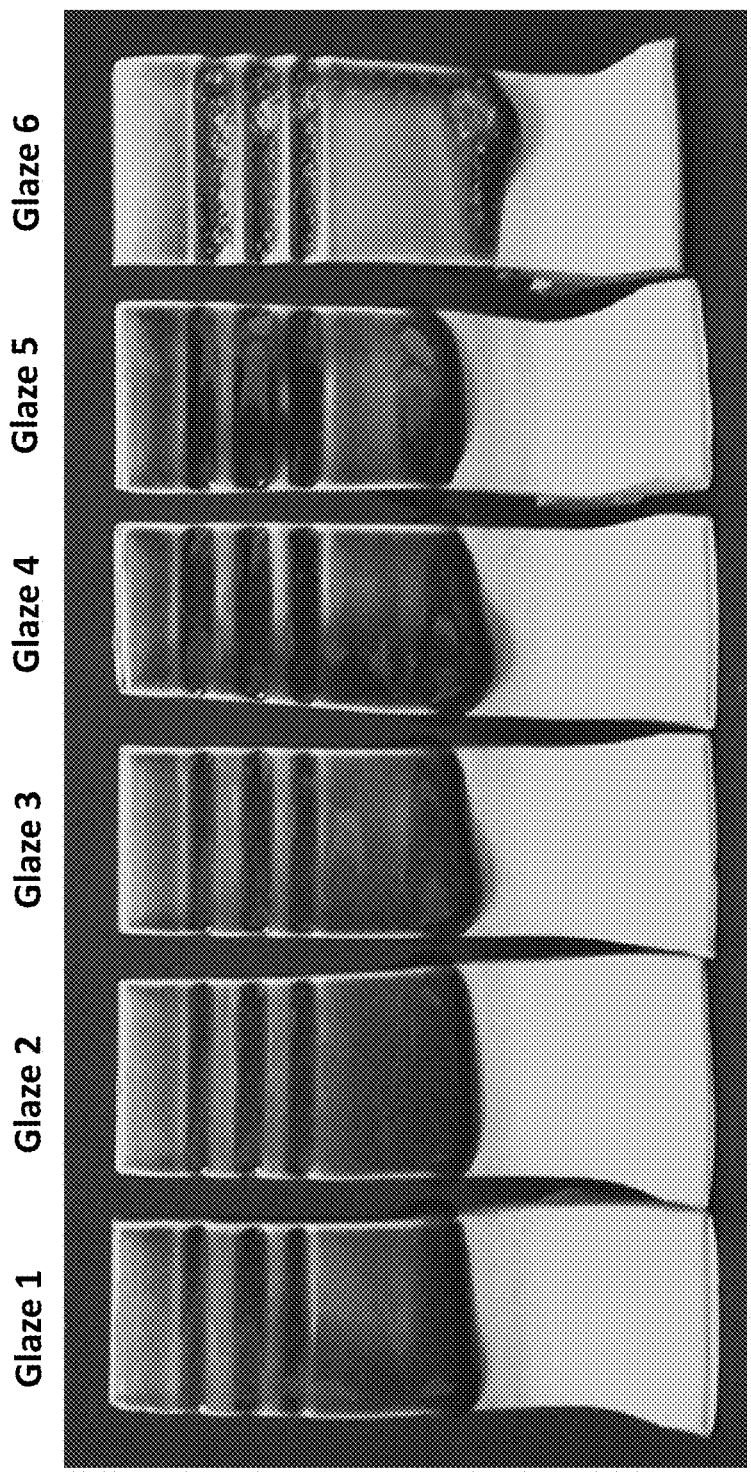

GOLD NANOPARTICLE IN CERAMIC GLAZE

CROSS-REFERENCE TO RELATED APPLICATIONS

The present application claims benefit of priority to U.S. Provisional Patent Application No. 62/412,543 directed to GOLD NANOPARTICLE IN CERAMIC GLAZE filed on Oct. 25, 2016, the entirety of which is incorporated herein by reference.

BACKGROUND

Field of the Embodiments

The field of the embodiments is generally methods and systems for making ceramic glaze. More particularly, the present embodiments are in the field of producing a ceramic glaze using a novel formulation including, gold nanoparticles, gold aggregate, and gold and silver salts, in a novel process.

Description of the Related Art

Ceramic glazes are used to protect and color tile, pottery, and large-scale ceramic structures. Glaze colors result from combinations of feldspars, silicas, clays, and metal colorants—often high amounts, e.g., anywhere from 4% to as high as 12%, of many different metals, including toxic metal colorants such as cobalt, barium, manganese, nickel, and chromium. For example, dark green requires a mixture of 5-10% cobalt and chromium; Prussian Blue requires 5-10% cobalt and manganese; orange red requires 1-4% cadmium and selenium; reds can contain 5-8% nickel—a known carcinogen. Despite health hazards due to leaching and other environmental concerns, these toxic materials remain standard in pottery glazes as they produce desirable colors.

Traditionally, specific heavy metals allow for various vibrant colors over time and under extreme conditions. These systems are either opaque or translucent, which call for various metal loading amounts. If a glaze is translucent, light must pass through it, strike metal colorants in its path, hit a white clay body, and be reflected back out, again striking more metal colorants to produce a visible color. This allows for vibrant, jewel-like colors. With opacifiers and thus opaque glazes, a rather large degree of metal—upward of 8-fold the amount needed for translucent glazes—is required at the metal surface, as light does not penetrate and reflect off of a white clay surface. While this will make a glaze more versatile to various clays, it also greatly increases cost, creates greater exposure hazards, and is more environmentally taxing with respect to opacifier and bulk metal consumption.

It is known that the use of noble metal nanoparticles (NPs) as stable and oxidation-resistant color sources dates back to Roman times, where organic chromophores decompose over time and do not survive ceramic or glass curing processes. The use of metal nanoparticle (NP) color alternatives allows for a metal-efficient and ecologically advantageous route to high-temperature permanent color on glass, silica surfaces, and in feldspathic ceramic glazes. This color is achieved through surface plasmon resonance (SPR) emission and has been demonstrated to be dependent on NP diameter, shape, and concentration for both intensity and wavelength of color. SPR emission is dependent on charge-density oscillations of individual particles and aspect ratio of non-spherical structures, which allows for color tuning despite being trapped in a solid glaze melt or silicate matrix. To that end, a variety of colors and shades (intensities) can be achieved by tuning NP diameter, aspect ratio, concentration of NP, and through controlling the methods by which these feldspar/silicate ceramic coatings are cured.

In particular, gold nanoparticles (Au NPs) have been found to be environmentally friendly and are considered non-toxic to humans as an alternate metal colorant in ceramic glazes. Additionally, the plasmon band observed with Au NP can result in vibrant solutions by manipulating NP size, shape, and concentration.

Previously, Au NP colorant systems have been developed for very precise instrumentation, in lab settings and as third-firing systems, and employed on already vitrified glossy surfaces as inks. They have been prepared with metal oxide nucleation precursors, with crystalline silica surfaces, and as dispersed pigments. As inks, Au NP pigments must be applied via inkjet printing adaptation, sintered again, such that more heat is consumed and a larger carbon footprint is created. Accordingly, such processes are time and cost prohibitive, and not easily adapted to bulk glaze materials for commercial ceramics. The following references are examples of such work with ink-based coloring systems: Blosi, M., Albonetti, S., Gatti, F., Baldi, G. & Dondi, M., "Au—Ag nanoparticles as red pigment in ceramic inks for digital decoration," Dyes Pigments 94, 355-362 (2012) and Cavalcante, P. M. T., Dondi, M., Guarini, G., Raimondo, M. & Baldi, G., "Colour performance of ceramic nano-pigments," Dyes Pigments 80, 226-232 (2009).

While other methods for producing ceramic surface color through Au NPs exist, these methods of preparation require sophisticated steps, equipment, and user controls. Further, Au NPs have been previously reported to diminish in size during sintering and possess significant differences in concentration with respect to reduction and oxidation firing atmospheres.

Thus, there remains a need in the art for a formulation and process incorporating use of noble metal NPs, e.g., Au NP, and Ag NP in glazes that would allow for efficient and effective coloring with low total metal loading concentrations that minimize leaching and avoid the heavy metal toxicity of traditional glazes. Such a formulation and process would ideally be applicable to commercial, e.g., traditional reduction, firing and production settings.

SUMMARY OF THE EMBODIMENTS

In a first exemplary embodiment, a process for producing a fired glaze containing gold nanoparticles (Au NPs), includes: loading a glaze material with less than 0.1 percent of an Au NP concentration; applying the loaded glaze to a component; and firing the component in a kiln, wherein the fired glaze on the component contains Au NPs after firing.

In a second exemplary embodiment, a pre-firing ceramic glaze material includes: multiple non-colorant materials; and at least one colorant material at a concentration of less than 0.1 percent of a total amount of the pre-firing glaze material, wherein the pre-firing glaze material produces an observable color on a ceramic item post-firing in a kiln.

In a third exemplary embodiment, a process for producing a fired glaze containing metal nanoparticles and an observable color, includes: mixing multiple non-colorant materials; loading at least one colorant material containing the metal nanoparticles at a concentration of less than 0.1 percent of a total amount of a pre-firing glaze material containing both the multiple non-colorant materials and the at least one colorant material; applying the pre-firing glaze to a component; and firing the component in a kiln, wherein the fired glaze on the component contains metal nanoparticles after firing.

BRIEF DESCRIPTION OF THE FIGURES

The following figures are intended to be part of the description of the embodiments herein and considered when reading the Detailed Description herein. The patent or application file contains at least one figure executed in color. Copies of this patent or patent application publication with color figures(s) will be provided by the Office upon request and payment of the necessary fee.

FIGS. 2a and 2b show Au NP diameter and absorbance characteristics in accordance with an embodiment described herein;

FIGS. 12a to 12d show reflectance characteristics for glazed ceramic pieces fired in reduction and oxidation environments wherein the glaze includes varying formulations in accordance with an embodiment described herein;

FIGS. 14a-14b are photographs showing a comparison of fired tiles with tiles prepared using glazes prepared with varying formulations and fired in reduction (FIG. 14a) and oxidation (FIG. 14b) environments in accordance with embodiments described herein.

DETAILED DESCRIPTION

The embodiments described herein provide for the preparation of a red, gold nanoparticle (Au NP) glaze with traditional firing methods that represents significant efficiency and ecological advancements over existing methods and allows for the replacement of commercial ceramic colorant methods, while retaining the costly equipment and firing methods already used. These embodiments are advantageous for and adaptable to all ceramic manufacturing facilities, including the production of tile, pottery, and large-scale ceramic structures. It allows for ceramic surface color while breaking standards for minimal amounts of transition metal colorant used. In addition to being more environmentally friendly and cost effective compared to existing glazing procedures, the nanoparticle-based glaze described here adds new colors to the known ceramic surface palette and offers greater consumer safety as an alternative to existing coloring processes that use higher concentrations of toxic metal and an increased risk of metal leaching from the final ceramic vessel into its contents (e.g., soil, beverage, food).

Figure 1:
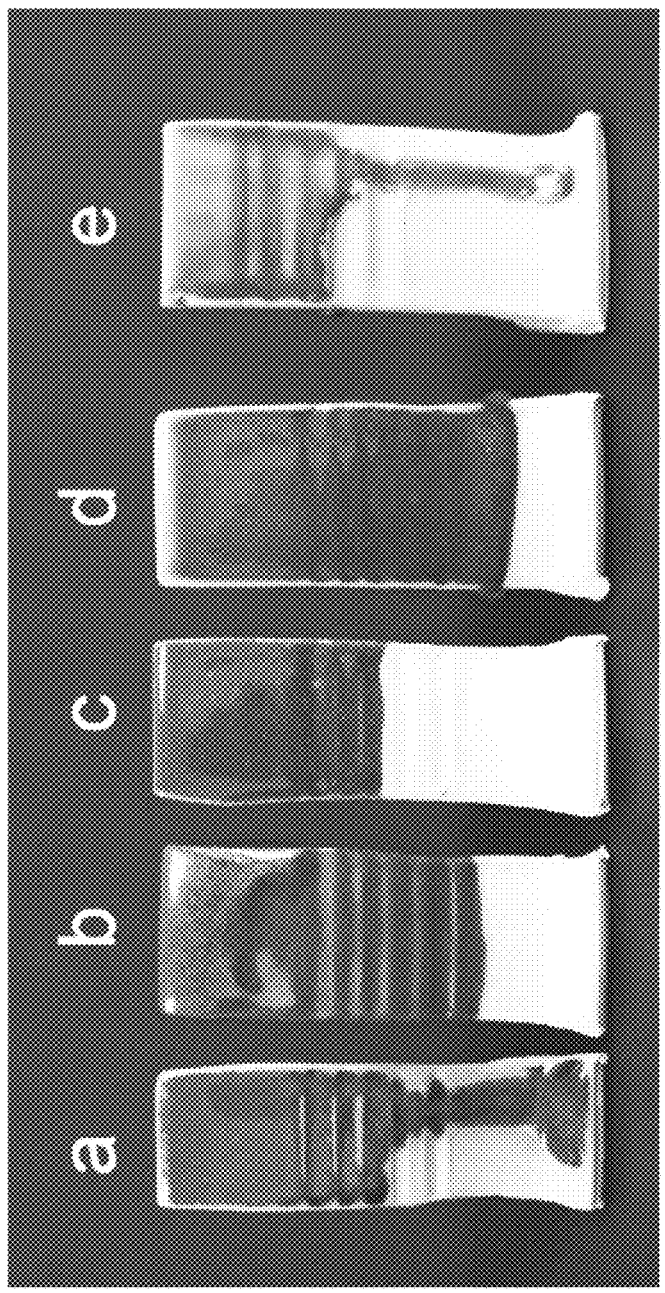
FIG. 1 is a photograph showing a comparison of prior art glazed and fired tiles with tiles prepared using Au NP-red colorants in accordance with an embodiment described herein.

Initially, preparation of glazes containing Au NP were prepared and fired onto glaze tiles and compared to prior art red glazes using known formulations, including Panama Red, Tomato Red, Oxidation Raspberry, and Pete's Cranberry to highlight color comparison. FIG. 1 shows a comparison of glazed tiles prepared using Au NP-red colorants in accordance with the embodiments discussed herein. Table 1 below details the different traditional formulations and one novel gold nanoparticle formulation for comparison.

| Panama Red (a) | | Tomato Red (b) | | Raspberry (c) | | Cranberry Red (d) | | Au NP Red (e) | |
|---|---|---|---|---|---|---|---|---|---|
| Dolomite | 7.76 | Dolomite | 10 | C. Spar | 31 | C. Spar | 73.8 | G200 | 20 |
| Borates | 10.67 | P. Spar | 36 | $CaCO_3$ | 21 | $CaCO_3$ | 11.1 | 3134 Frit | 20 |
| $SrCO_3$ | 4.17 | Ball Clay | 12 | Borates | 8 | Borates | 10.2 | EPK | 20 |
| $CaCO_3$ | 2.60 | Silica | 12 | EPK | 9 | Silica | 4.9 | Silica | 19 |
| ZnO | 2.60 | Talc | 9 | Talc | 4 | | | Wollastonite | 15 |
| C. Spar | 44.10 | Bone Ash | 12 | 3134 Frit | 9 | | | Talc | 6 |
| 3110 Frit | 9.70 | Iron Oxide | 9 | Silica | 18 | | | | |
| EPK | 2.60 | | | | | | | | |
| Silica | 15.80 | | | | | | | | |

-continued

| Colorant | | Colorant | | Colorant | | Colorant | | Colorant | |
|---|---|---|---|---|---|---|---|---|---|
| $SnO_2$ | 2.62 | $Li_2CO_3$ | 2 | $SnO_2$ | 5 | $SnO_2$ | 1.5 | $SnO_2$ | 0-4% |
| $CuCO_3$ | 1.75 | *$Fe_2O_3$* | 9 | $CrO_2$ | 0.2 | $CuCO_3$ | 0.4 | AuNP | 0.015-0.10% |

In a first embodiment, Au NPs are prepared in the lab, concentrated, and used in small glaze batches, which are shown to be stable for long periods—over months. Stabilized suspensions of Au NPs are known to be highly colored with the identity of color ranging from red to purple depending on the size of the particles. The particles are synthesized from metal salts like $HAuCl_4$. (See, Musick, M. D. et al., Chem. Mater. 12, 2869-2881 (2000)). The suspensions are surface-capped with citrates, mercaptans, sulfur-containing and other surfactants. The color is related to the surface plasmon resonance (SPR). SPR involves the conduction of electrons at the interface between a negative and positive permittivity material that is stimulated by incident light. Additives that adhere to the surface of the particles can further modify the color.

The Au NPs used in the first embodiment discussed below are citrate-stabilized nanoparticles (CS-NPs) synthesized from in-house $HAuCl_4$ using previously developed procedures discussed in Musick and Schmidt et al., "Nanoparticle Film Assemblies as Platforms for Electrochemical Biosensing—Factors Affecting the Amperometric Signal Enhancement of Hydrogen Peroxide," Langmuir 29, 4574-4583 (2013). Briefly, a 1 mM $HAuCl_4$ aqueous solution was placed in a flask fitted with a reflux condenser and brought to reflux with constant stirring. Ten milliliters of a 38.8 mM (aq) sodium citrate solution was added and promoted color transitions from light yellow to colorless and to burgundy (wine red). After 10 min of reflux, the solution was removed from heat and allowed to cool to room temperature with continued stirring. The product was vacuum filtrated with a 0.8 μm Gelman membrane filter and stored protected from light. Characterization of CS-NPs by UV-Vis spectroscopy (Agilent 8453 Photo Diode Array) and transmission electron microscopy (TEM) showed the characteristic surface plasmon band (SPB) at 520 nm and an average diameter of 10.3±2.7 nm as illustrated in FIGS. 2a and 2b.

For the Au NP Red in Table 1, citrate-stabilized Au NPs were concentrated in a SORVALL RC-5B ultracentrifuge at 10,000 rpm at 5° C. for 1.5 hours. The supernatant solution was poured off and the resulting concentrated NP solution was collected as roughly 30 mL for each batch. For preparation of the AuNP-loaded glaze, a dry glaze powder was prepared in 80 gram batches of 20% G200 feldspar, 20% Ferro Frit 3134, 20% EPK, 19% flint/silica, 15% wollastonite, and 6% talc. The concentrated Au NP was added to each glaze mixture in volumes allowing for 0.015%, 0.050%, and 0.100% loading, respectively, water was added as needed, mixed, sieved, and applied to tiles with and without the addition of 4% $SnO_2$ for opacity and color-brightening. Accordingly, 6 different Au NP red formulations were prepared. Each of the 6 Au NP red formulations was tested separately in both an oxidation and reduction atmosphere kiln.

For oxidation atmosphere samples, tiles were loaded in electric nichrome coil kilns and fired on a medium temperature ramp in an oxygen-rich atmosphere. It should be noted that the kilns used were not vented via a large hood and air/fume convection, but instead have a fan/draw system that pulls air down, through the kiln and out a port in the base of the kiln, which contributes to an increased oxidative atmosphere during firing. As a test, a glaze with $Cu_2O$ red copper was prepared, fired in this atmosphere, and was observed to turn green (oxidation state change from $Cu^{1+}$ to $Cu^{2+}$) due to the oxidative nature of this process.

For the reduction atmosphere firing samples, tiles were loaded in a sliding door gas kiln alongside normal pottery. Pilot lights were started immediately after loading to slowly warm the brick kiln and the chimney, such that air draw would be initiated. After roughly 4 hours of pilot light heat, burners were started on a very low setting, left on overnight, and slowly heated the kiln to roughly 800-1000 degrees by the next morning with a slightly reductive atmosphere via CO production via natural gas combustion. The next morning, burners were put on 2 pounds of gas pressure, such that the kiln is put into a soft reduction climb and monitored. Upon reaching cone 012, ~1640° F., gas pressure is increased to 3 pounds and the chimney damper is pushed in slightly, limiting the amount of oxygen access to the combustion process and thus creating an aggressively reductive atmosphere in the kiln. This change is visible by a significant difference in flame color (red-orange), soft movement of flame inside the kiln, and by soot production. This atmosphere is maintained up to roughly cone 04, ~1940° F., after which a softer reduction atmosphere is created by allowing increased chimney air flow. This softer reductive atmosphere is maintained for the remainder of the firing to cone 10, 2345° F., after which the gas is shut off, all ports are closed, and the kiln is allowed to cool slowly over 36 hours to prevent cracking/crazing/dunting of the ceramic surfaces.

In order to characterize the Au NPs post-firing, crushed portions of the fired glaze tiles were suspended in ethanol and deposited on copper 400-mesh TEM grids. Images of glaze tiles were obtained for each set of samples in reduction and oxidation at 0.015%, 0.050%, and 0.100% AuNP both with and without 4% $SnO_2$ opacifier. TEM imaging of the tiles was performed. The glaze exists as a silicate matrix with the Au NPs locked in a solid suspension and distributed throughout. TEM imaging analysis of the samples showed large silicate glaze grains with Au NP initially visible at the edge of grains. In these, imaging of the particles was performed by focusing down, through cross-sections of grains, in which some few Au NPs are in focus and others are blurred dependent on the depth of focus into the grain and the depth of each respective particle in relation to that focus. Multiple images were taken of each sample at 80 kV, 50,000× magnification, such that roughly 100 particles could be used for sizing analysis and histogram generation.

Figure 3A:
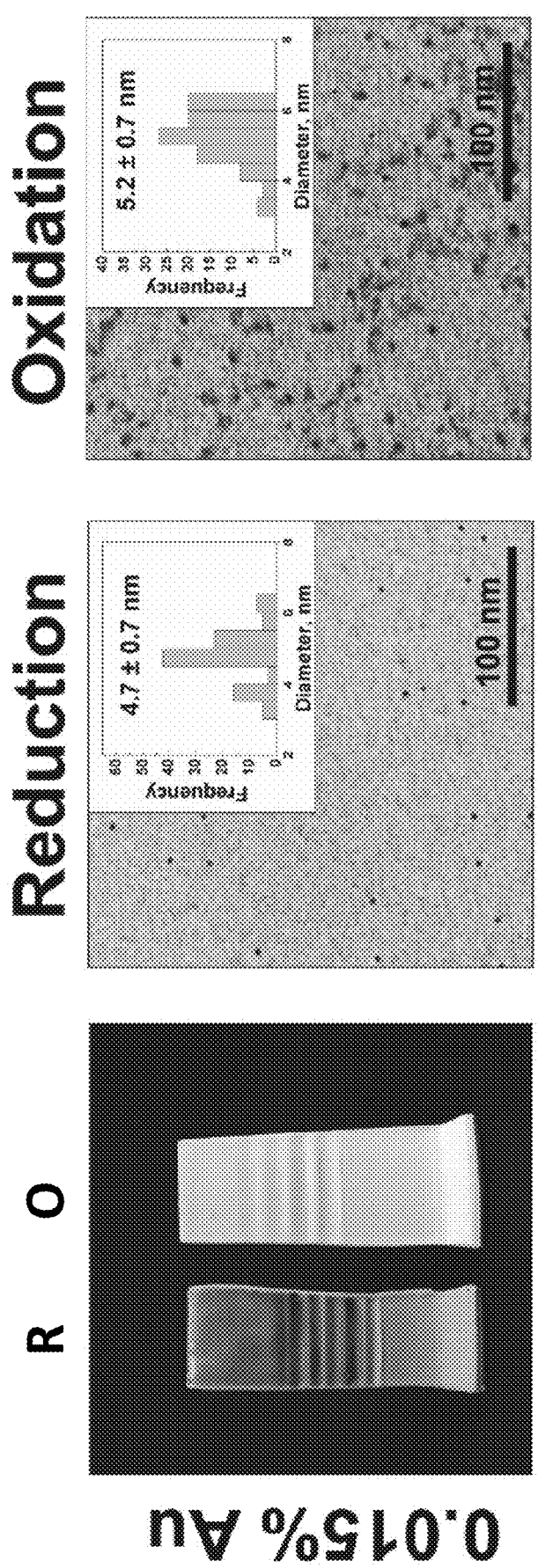
FIGS. 3a to 3c include photographs of glazed ceramic pieces fired in reduction and oxidation environments wherein the glaze includes varying percentages of Au NP and diameter vs. absorbance characteristics of same in accordance with an embodiment described herein.
Figure 3B:
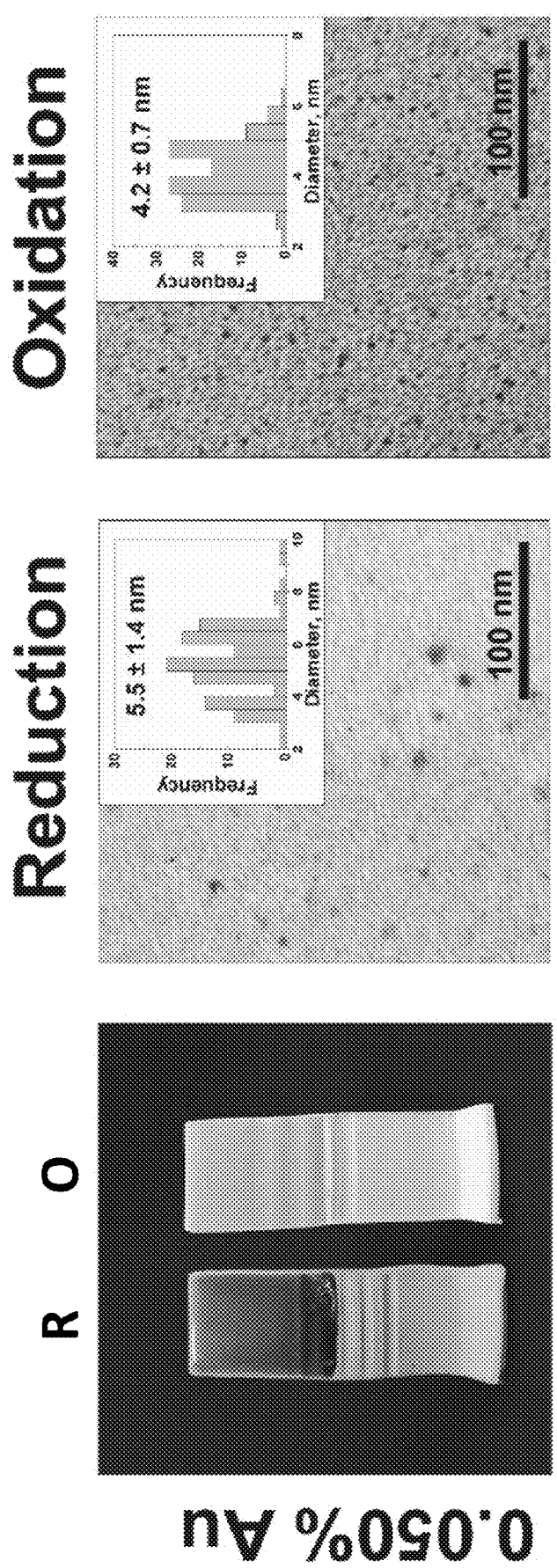
Figure 3C:
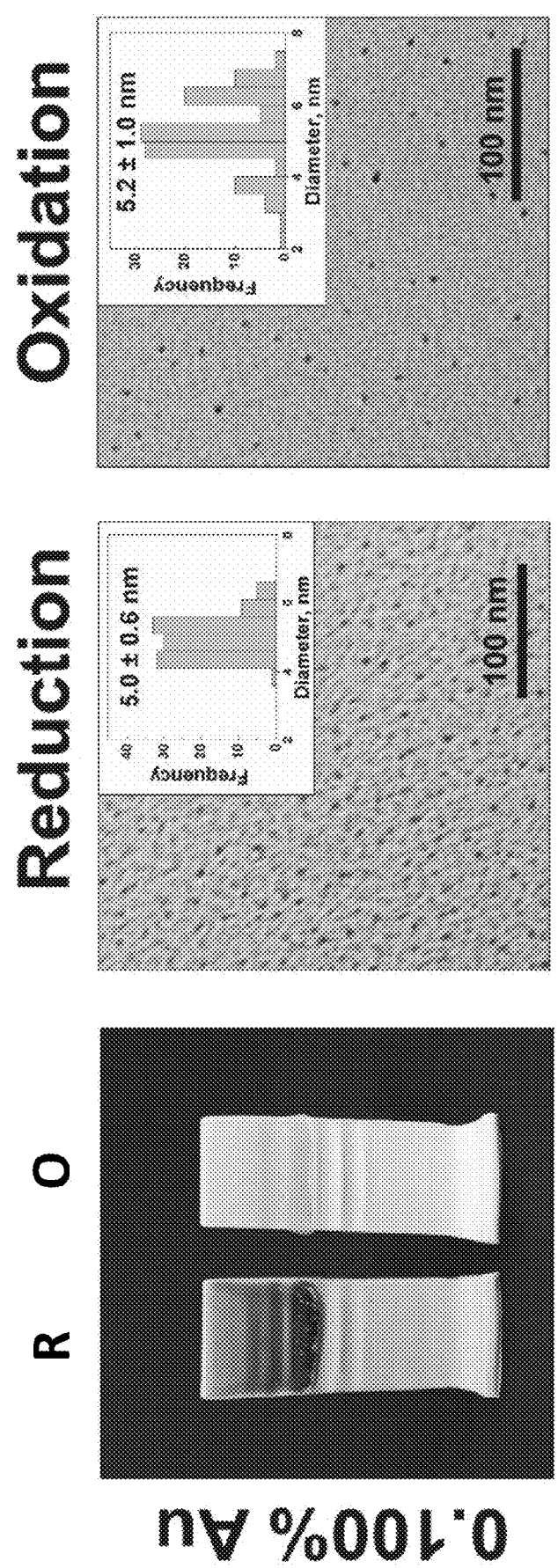

As shown in FIGS. 3a-3c, Au NPs are observable at the lowest gold NP loading reduction sample, 0.015%, with consistent particle sizing analysis through the 0.050% and 0.100% Au salt tiles. For the reduced neat tiles, Au NPs were imaged with average particle diameters of 4.7±0.7 nm, 5.5±1.4 nm, and 5.0±0.6 nm for the 0.015%, 0.050%, and 0.100% Au samples, respectively. For the oxidized neat tiles, particle sizing revealed diameters of 5.2±0.7 nm, 4.2±0.7 nm, and 5.2±1.0 nm for the 0.015%, 0.050%, and 0.100% Au samples, respectively. Interestingly, these diameters are statistically similar across reduction and oxidation atmosphere firings, despite drastic differences in atmosphere and visible color. Further, the Au NP particle diameter is reduced by roughly half by both firing processes. The Au NP red tiles in FIGS. 3a-3c did not include $SnO_2$ opacifier.

Figure 4A:
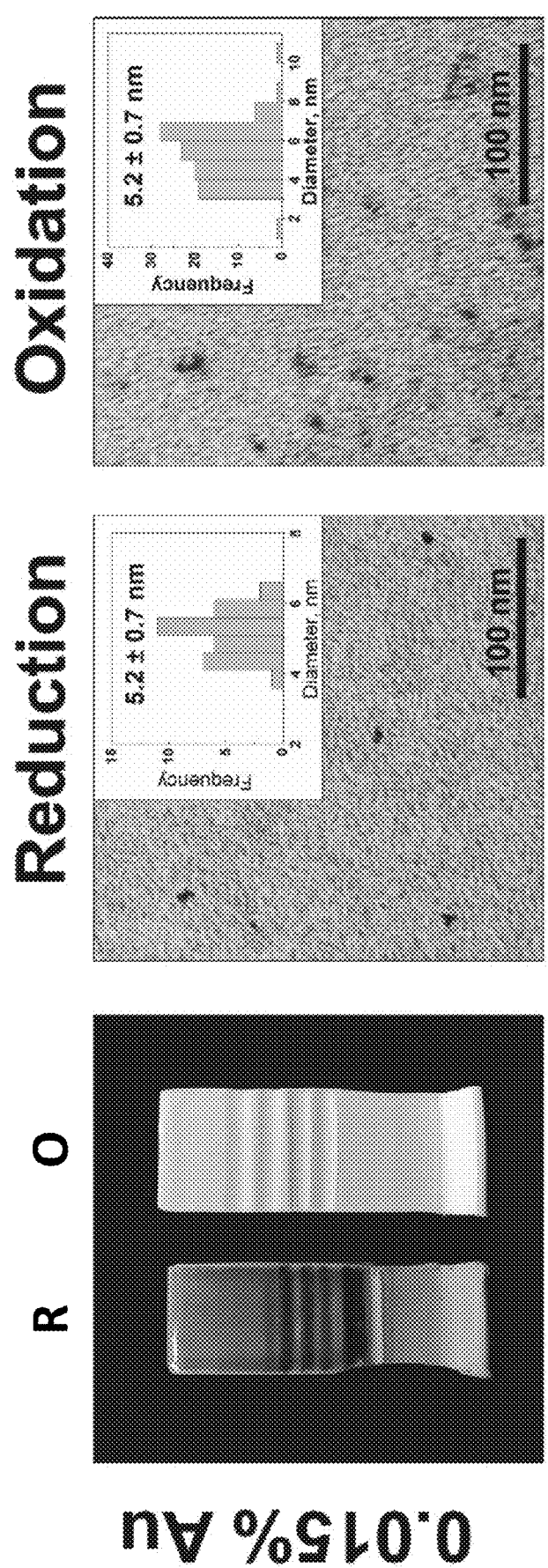
FIGS. 4a to 4c include photographs of glazed ceramic pieces fired in reduction and oxidation environments wherein the glaze includes varying percentages of Au NP plus opacifier and FIGS. 4a to 4c further show diameter vs. frequency characteristics of same in accordance with an embodiment described herein.
Figure 4B:
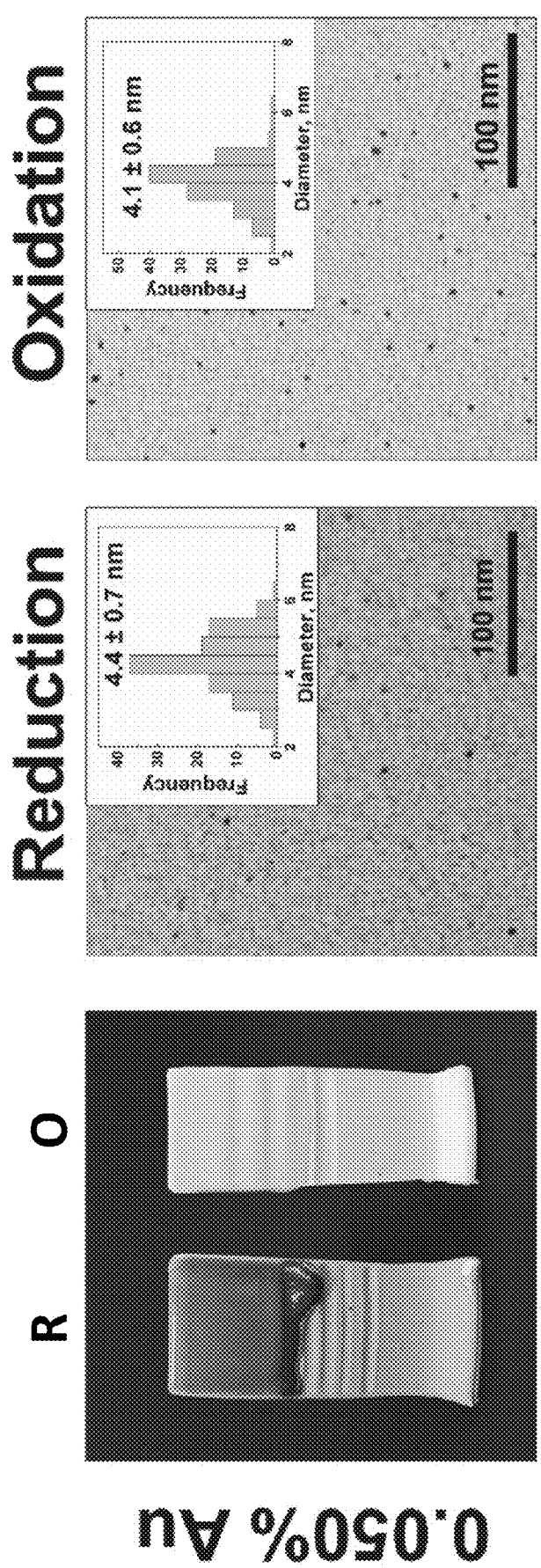
Figure 4C:
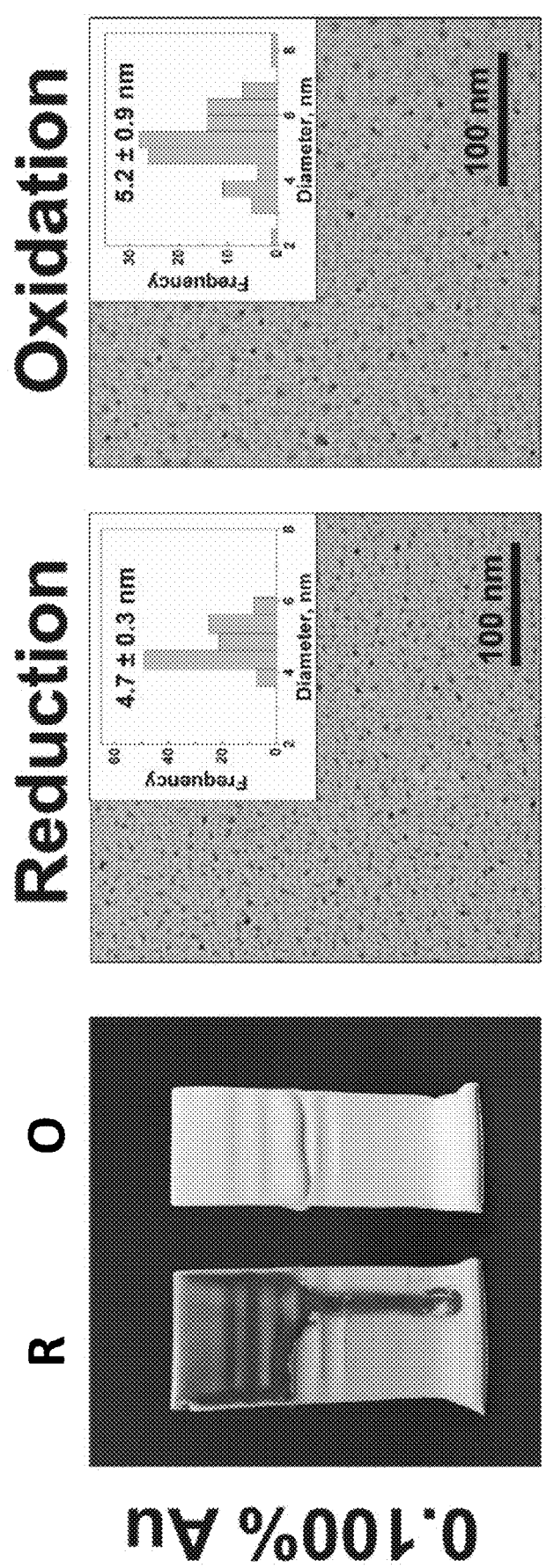

As shown in FIGS. 4a-4c, similar trends were observed in particle size across oxidative and reductive firing methods for both systems with 4% $SnO_2$ opacifier. For the reduced tiles with 4% $SnO_2$, Au NPs were imaged with average particle diameters of 5.2±0.7 nm, 4.4±0.7 nm, and 4.7±0.3 nm for the 0.015%, 0.050%, and 0.100% Au samples, respectively. For the oxidized samples with 4% $SnO_2$, particle sizing analysis revealed diameters of 5.2±0.7 nm, 4.1±0.6 nm, and 5.2±0.9 nm for the 0.015%, 0.050%, and 0.100% Au samples, respectively. Again, all particle diameters are statistically similar. The effect of the 4% $SnO_2$ opacifier is notable in FIG. 4c where some slight brightening is shown in the reduction tile. For reduced samples, color is immediately visible at 0.015% Au loading and intensifies up to and through 0.100% Au. This is true for both the neat and opacified samples fired in a reduction atmosphere. For the oxidation tiles, no red color is visible at the lowest loading (0.015%) while a faint pink color becomes visible at 0.050% AuNP and retains a roughly consistent red intensity at 0.100%.

For the reduction atmosphere glaze samples, TEM analysis revealed stable Au NP suspended within the glaze. In the recipe, no other metal colorant was included; additionally, the original glaze is a clear base. This presence of color and imaging of Au NP supports the presence and majority contributor of color from plasmon resonance of the Au NP. Surprisingly, the faint pink color of the oxidation-fired samples is likely due to plasmon resonance as well, as the particles can be imaged via TEM and are statistically similar in size but appear to be present in less concentrated amounts.

Referring to FIGS. 3a-3c and 4a-4c, color trends are similar for the opacified samples as that of the neat samples between reduction and oxidation-fired tiles. No significant brightening was observed in the oxidation tiles, though opacity was noticeable alongside a pink/faint red tint. Again, all samples possessed Au NPs, imaged via TEM analysis, which possessed statistically similar size distributions.

Figure 5:
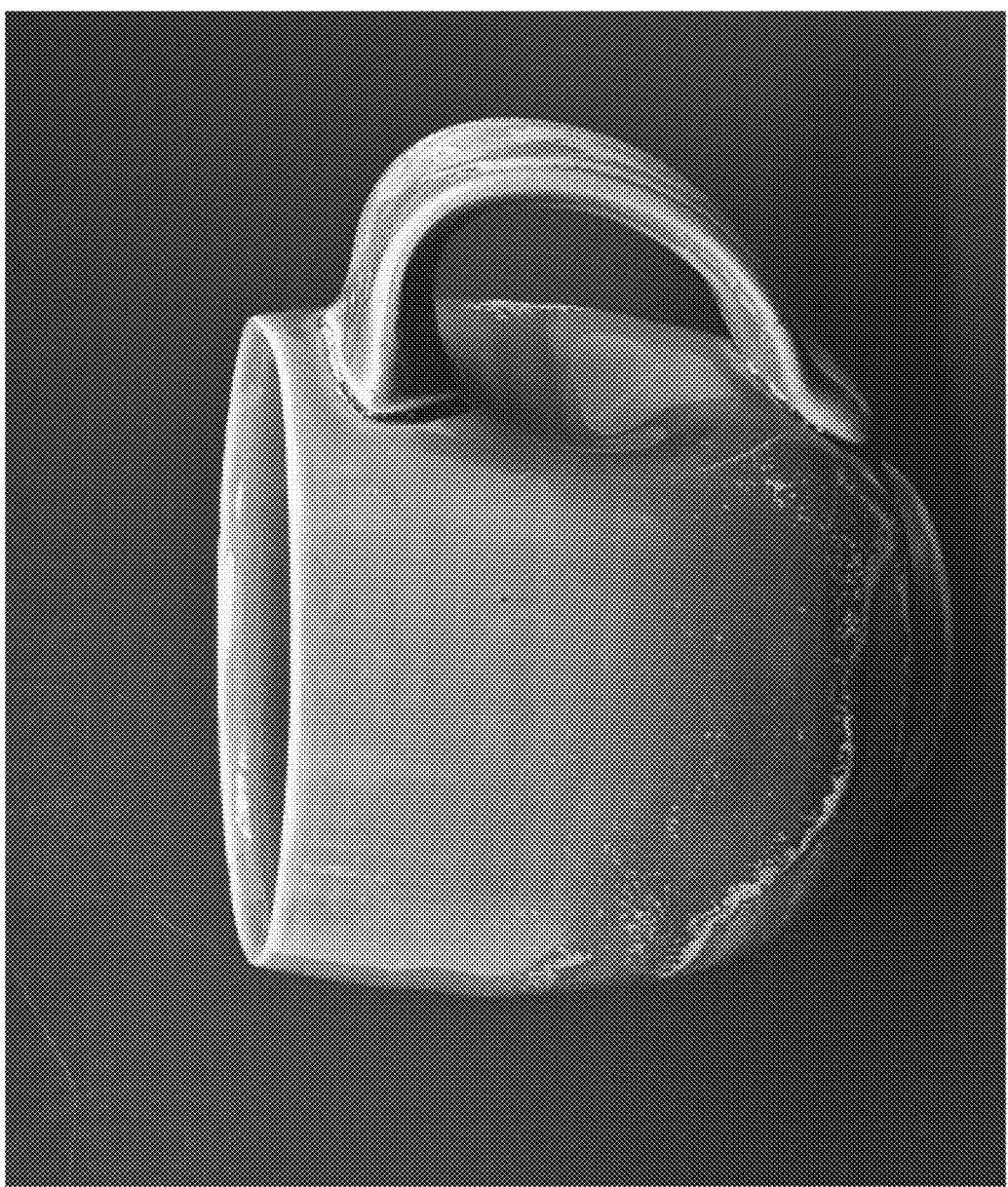
FIG. 5 is a photograph of a glazed ceramic mug, wherein the glaze includes Au NP in accordance with an embodiment described herein.

Additionally, the NP-doped glaze material can be both dipped and spray-applied to ceramic surfaces, fired under traditional reduction methods, to create functional, low metal-loading wares, as seen in FIG. 5. At 39 mg of $HAuCl_4$ per 100 mL batch of colloidal AuNP, this mug contains (at most, after centrifugation) 23 mg Au metal for color. With the current market rate of gold at 1,214$/ounce, this mug costs roughly 0.98$ USD in gold.

Returning to FIG. 1, compared to traditional red glazes with metal oxide colorants and coordination environment brighteners/opacifiers ranging from 2 to 11% by weight—the use of Au NPs for low metal loading color alternatives through plasmon resonance allows for comparable color systems with anywhere from 20 to nearly 1000-fold less bulk metal loading. These colors and surfaces are comparable to current systems that wastefully use bulk metal at the glaze surface. With color appearance at 0.015% Au and stable, hearty color present at 0.100% Au, this work presents a new color alternative that is both ecologically and environmentally advantageous.

The first embodiments described above are directed to a Au NP-based glaze for use in an alternate, cost-effective, and safer process to color ceramics. Exemplary formulations of this glaze include 0.015%, 0.050%, and 0.100% gold nanoparticle loading content and can be used in both traditionally reduction and oxidation kiln atmospheres. The resulting color of the ceramic with the use of this new nanoparticle-based glaze is achieved with 50 to 800-fold decrease in heavy metal consumption compared to traditional, existing colored glazes. The color attained with this new glaze utilizes the surface plasmon resonance effect known to exist in these nanomaterials. The gold nanoparticle synthesis, itself, is known and commonly used for a variety of applications; however, it has not previously been adapted to being incorporated into a glaze base or adapted to raw glaze precursors.

As discussed above, Au NP particle size is diminished and a purple color is observed in the final product in both the oxidation and in reduction kiln atmospheres. And though both firing environments retained Au NPs, the reduction atmosphere firing method demonstrated more substantial color.

Armed with the results discussed above, additional testing was completed to better understand why, all other variables being equal, the reduction atmosphere firing method produced more substantial color. It was hypothesized that during the reduction firing, the atmosphere was conducive to the spontaneous formation of NPs. Accordingly, though the size and number of NPs was reduced during both oxidation and reduction firing, a reductive environment results in a larger number of remaining NPs as compared to the oxidative environment. A higher concentration of NPs provides more surface area for effectuating the surface plasmon resonance of the Au NPs which relates to color reflectance.

Figures 6A, 6B, 6C:
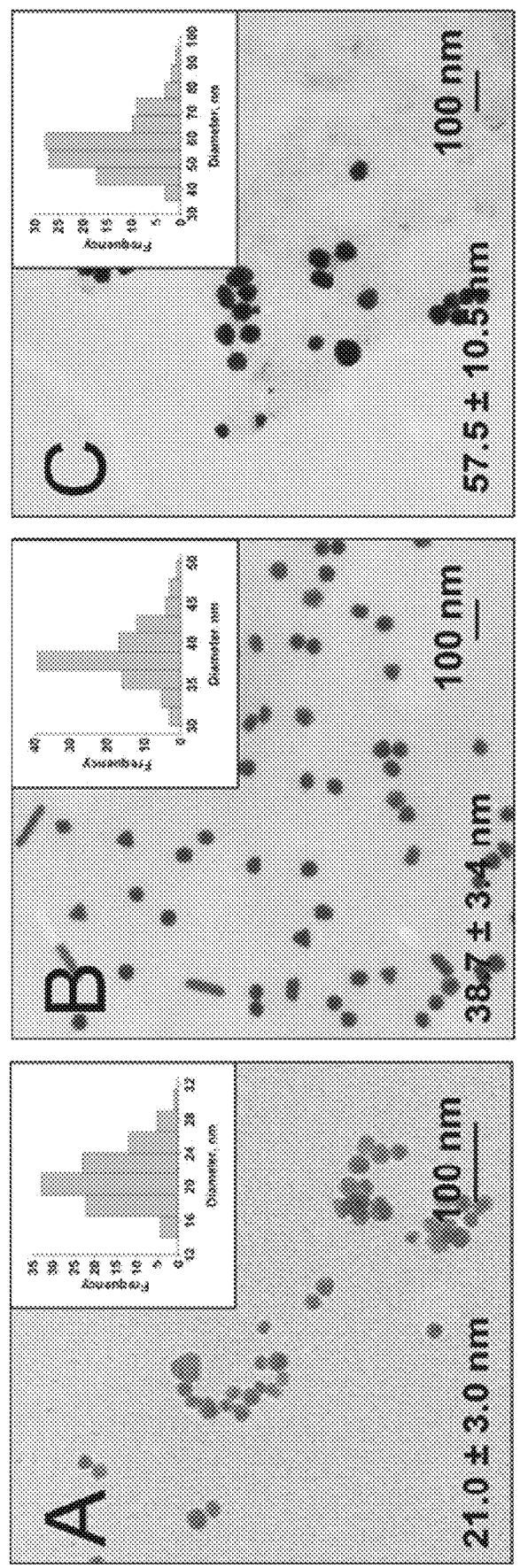
FIGS. 6a-6c are TEM images of varying Au NP glaze solutions before firing with inset histograms of particles size distribution of each batch in accordance with an embodiment described herein.

To test this hypothesis, first glazes containing different sizes of Au NPs were prepared. FIGS. 6a-6c are TEM images of the varying solutions before firing with inset histograms of particles size distribution of each batch (n=100). Batch A yielded Au NPs with diameters of 21.0±3.0 nm (n=100). Batch B yielded Au NPs with diameters of 38.7±3.4 nm (n=100). Batch C yielded Au NPs with diameters of 57.5±10.5 nm (n=100).

Figure 7A:
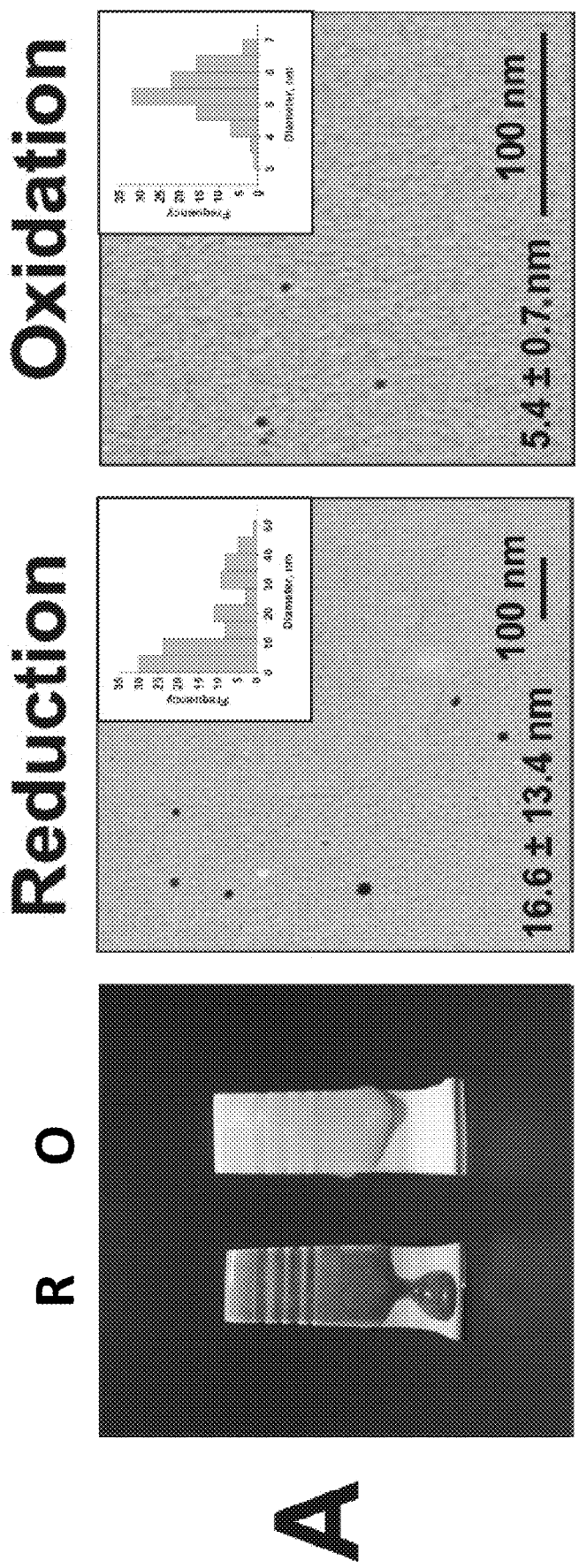
FIGS. 7a to 7c include photographs of glazed ceramic pieces fired in reduction and oxidation environments wherein the glaze includes multiple size Au NPs in accordance with the TEM images of FIGS. 6a-6c and FIGS. 7a to 7c further show diameter vs. frequency characteristics of same in accordance with an embodiment described herein.
Figure 7B:
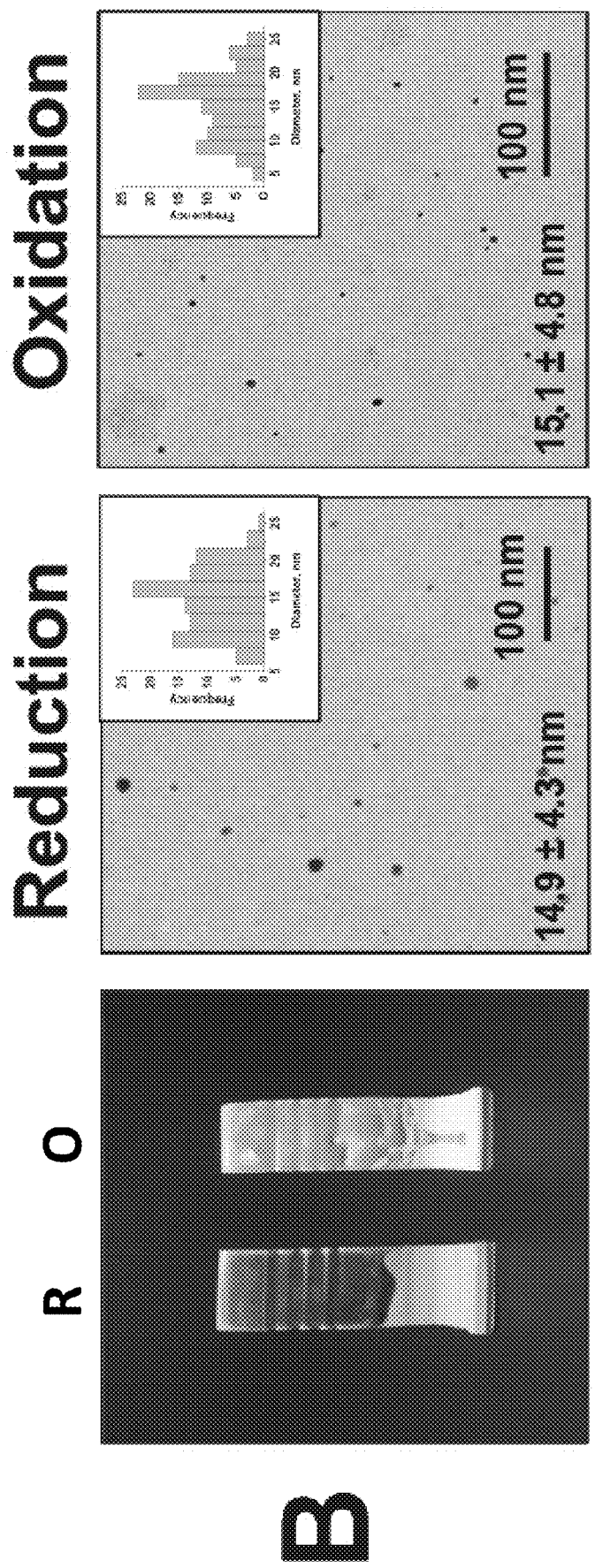
Figure 7C:
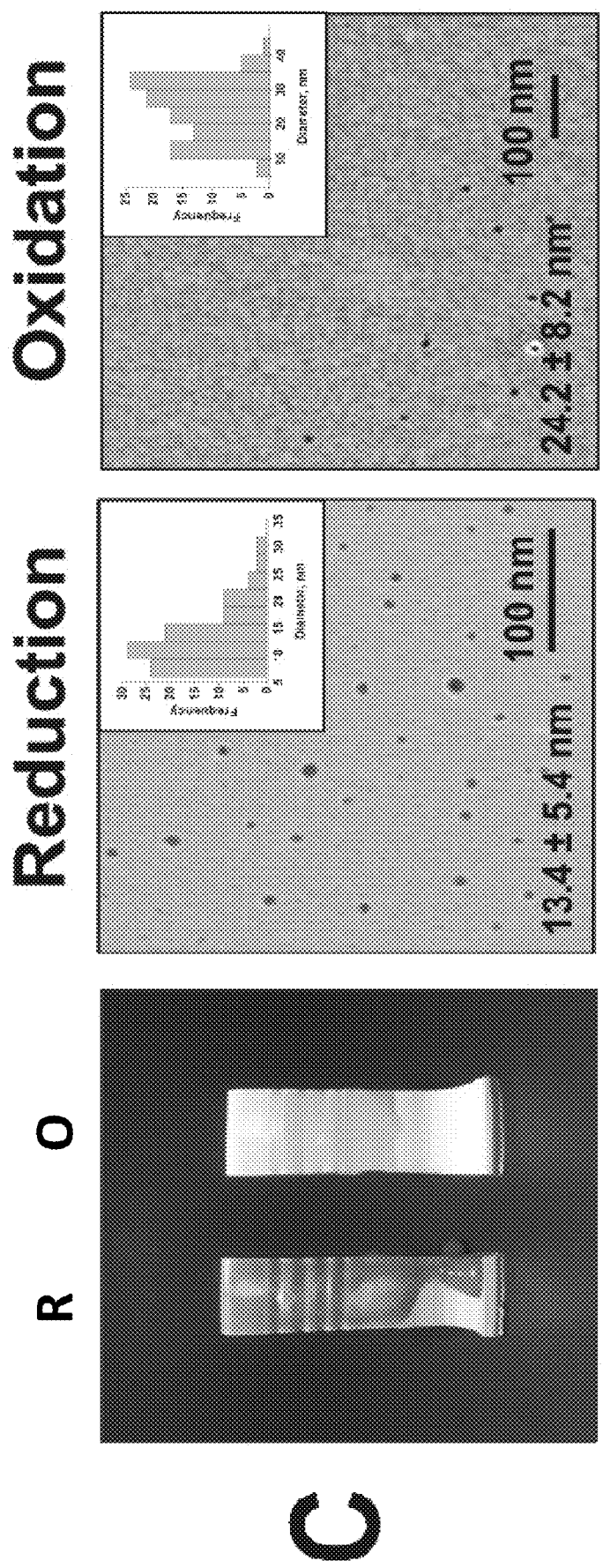

Next, each Au NP glaze was fired in both a reduction kiln and an oxidation kiln. The results of firing are illustrated in FIGS. 7a-7c. After oxidation firing, the glazes produced visibly less intense colors, suggesting a significant decrease in NP concentration. MS Au NP glazes produced light pink hues for all three batches A, B and C. Samples were obtained from all tiles, imaged via TEM, and particle sizing analysis performed on each sample (n=100). Batch A yielded particle sizes of 5.4±0.7 nm. Batch B produced particle sizes of 15.1±4.8 nm. Batch C produced particles sizes of 24.2±8.2 nm. All three batches had normal size distribution for samples produced in the oxidation atmosphere.

After reduction firing, all three batches resulted in similarly distributed sizes and created similar or roughly identical colors, with a large number of particles in the 10 nm range. This is suggestive of renucleation and growth during firing in a reductive atmosphere. In a gas reduction firing, lower oxygen levels in the kiln allows for incomplete combustion within the kiln, yielding high concentrations of carbon monoxide. The accepted mechanism for ceramic glaze reduction is such that the carbon monoxide strikes the surface of ceramic body, abstracting oxygen from the surface of the glazes, forming $CO_2$, and reducing the glaze surface. While heat during firing allows for the degradation of NPs, this reductive atmosphere allows for the reduction of free Au atoms, nucleation, and finally reformation into NPs via growth. The reformation of new nanoparticles in a reductive firing would provide for smaller but more abundant Au NPs in the glaze, which allows for consistently vibrant colors regardless of starting size. The concentration of NPs in these glazes can be directly related to color reflectance due to the surface plasmon resonance of the Au NPs.

Figures 8A, 8B, 8C:
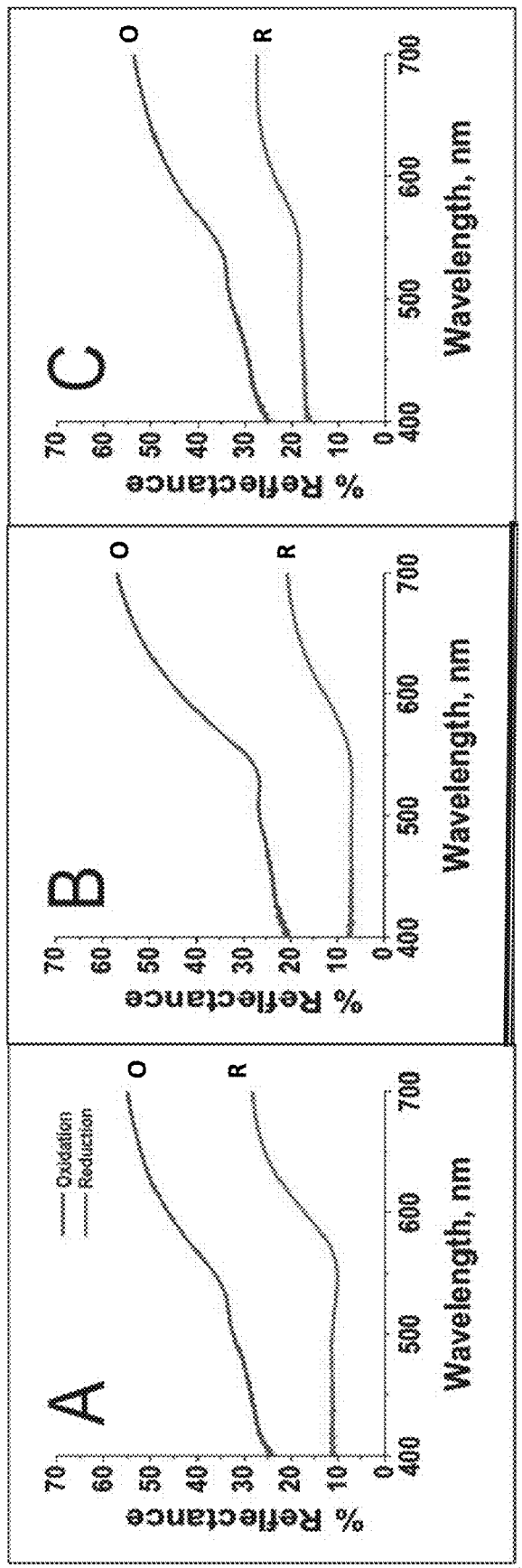
FIGS. 8a to 8c show reflectance characteristics for glazed ceramic pieces fired in reduction and oxidation environments wherein the glaze includes Au NPs having different diameters in accordance with an embodiment described herein.

Referring to FIGS. 8a-8c, as the concentration of Au NPs increase, the intensity of color increases. Samples were analyzed using an Ocean Optics Halogen lamp (HL-2000-FHSA) and Flame miniature spectrometer (FLAME-S-VIS-NIR-ES, 350-1000 nm) to quantify the produced colors. Percent reflectance of the samples was measured using the spectrometer. Percent reflectance has a reciprocal relationship with color intensity; darker samples demonstrate a lower reflectance profile and a somewhat more pronounced reflectance color band, while the lighter samples have a higher reflectance profile, as more total light is reflecting off of the samples and individual color bands are less pronounced.

Figure 9:
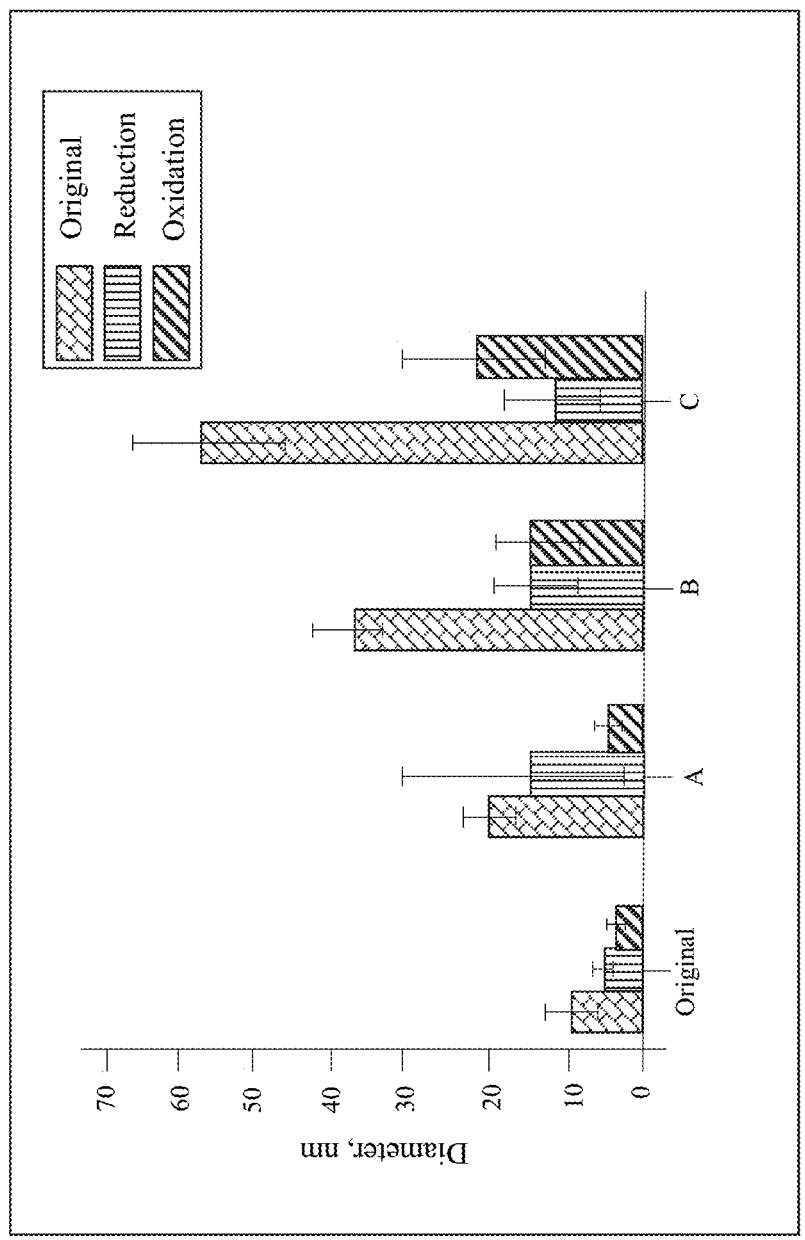
FIG. 9 shows pre- and post-firing diameter characteristics for the Au NPs in various glazes in accordance with an embodiment described herein.

The glazed samples were also analyzed using TEM in order to assess NP characteristics. FIG. 9 shows NP particle size trends from batches A-C post-firing in both reduction and oxidation kilns as compared to an original batch (O) particle size as synthesized and characterized as shown in FIGS. 2a-b above. As discussed, the results shown support the hypothesis that the reduction process promotes renucleation and growth, i.e., spontaneous formation, of NPs during firing. A reduction atmosphere causes consistent NP degradation for all four samples. The average diameters of the reduced MS NP samples were all statistically similar to each other. The oxidative atmosphere, conversely, produces particles with diameters that are more relative to their original starting size for Batch A. As the starting particle size increases, the final particle size after firing becomes larger. This phenomenon is consistent with the mechanisms proposed above. As the oxidative atmosphere does not promote significant renucleation and growth, the reduced Au atoms nucleate and grow to shift statistical averages down—with oxidative samples demonstrating larger particle diameter averages. The similar color profiles of the oxidized MS NP samples in FIGS. 8a-8b and increasing particle sizes in FIG. 9 suggest that the color is dependent on both the concentration and diameters of the Au NPs. Although batches O and A have the smallest particles, they appear to be in a greater abundance within the glaze after firing. Similarly, batch C has the largest particles but fewer NPs overall—demonstrating less intense color in FIG. 7c.

The demonstration and realization of spontaneous NP formation during firing, may support removal of the NP synthesis step prior to kiln sintering. Thus, skipping the expensive and tedious steps of traditional nanoparticle synthesis, the embodiments provide further benefits and efficiencies over the prior art by facilitating a more direct process. Additionally, the processes described above with respect to Au NPs are also applicable to other materials, including silver (Ag), thus expanding the achievable color range.

To prove out these efficiencies, $HAuCl_4$, aggregated Au NP waste (Au Agg) collected from previous Au NP experiments such as those discussed herein, $AgNO_3$, as well purchased Ag NPs were used to prepare 4 separate glazes. More particularly, glazes consisted of 20% Kaolin EPK, 19% silica, 6% talc, 20% frit 3134, 15% wollastinite, and 20% G-200 feldspar. 38.39 mg of $HAuCl_4$ and 100 mg of $AgNO_3$ were added to 160 g and 200 g glaze batches, respectively. Aggregated Au NPs were added to a 200 g glaze batch referenced above. Silver NP solution (10 mL) was added to 80 g glaze batches of the glaze formulation mentioned above. Ceramic samples were then dipped in each of the four (4) glazes and fired in both reductive and oxidative kilns at cones 10 (1285° C., 2345° F.) and 6 (1200° C., 2200° F.), respectively.

Figures 10A, 10B:
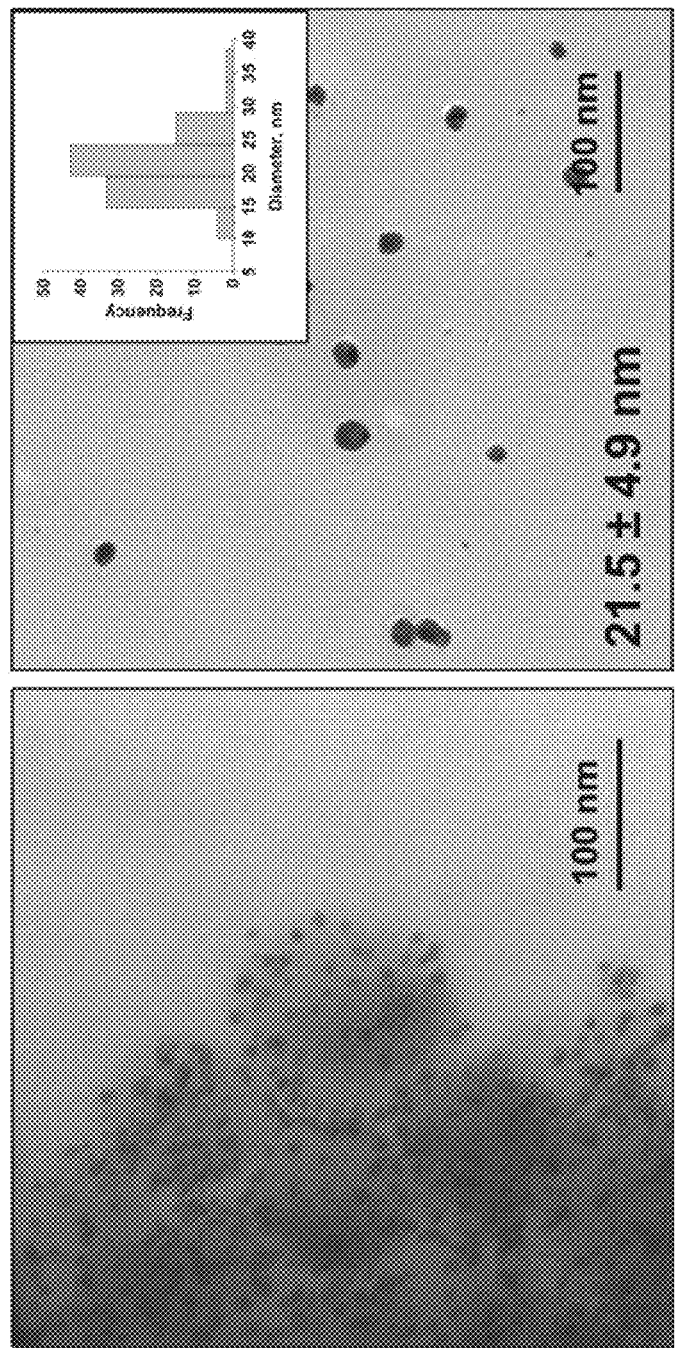
FIGS. 10a-10b are TEM images of gold nanoparticle aggregate (Au NP Agg) (FIG. 10a) and stock silver nanoparticles (Ag NP) (FIG. 10b) used in various embodiments described herein.
Figure 11A:
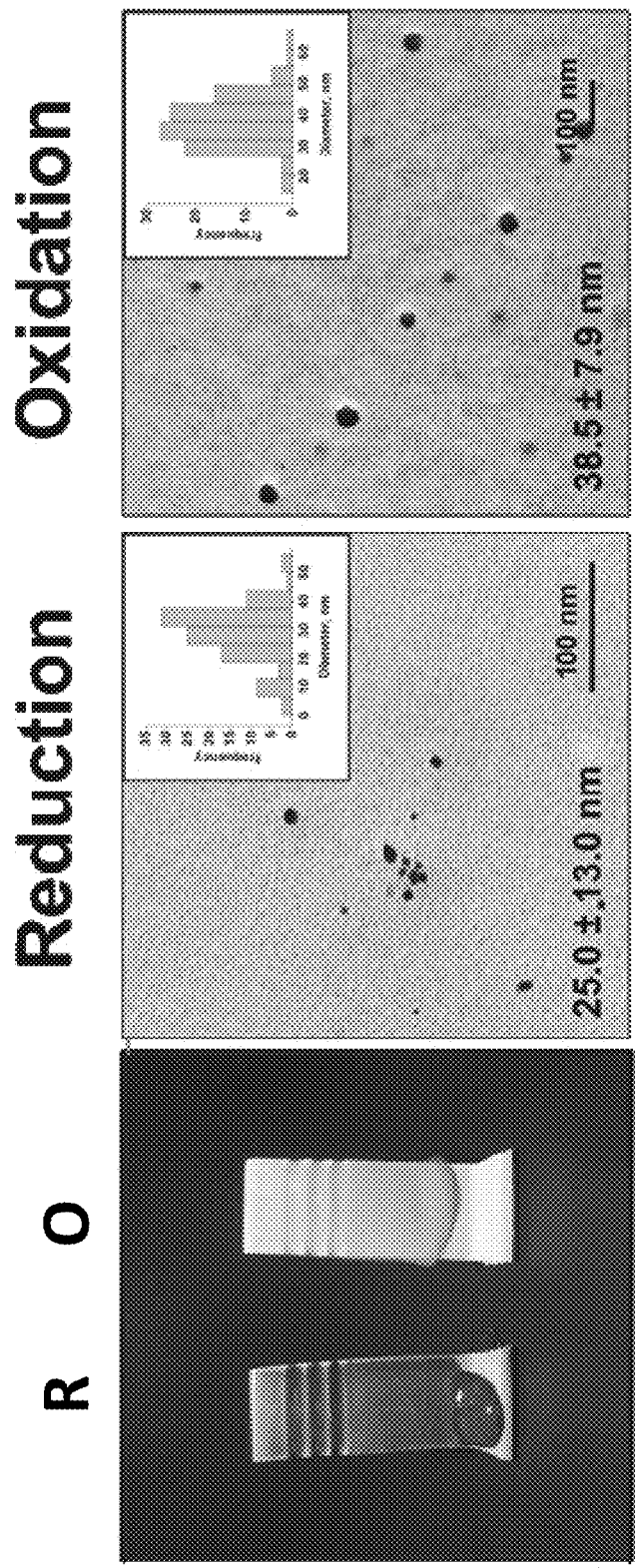
FIGS. 11a to 11d include photographs of glazed ceramic pieces fired in reduction and oxidation environments wherein the glazes include different formulations in accordance with the TEM images of FIGS. 10a-10b and FIGS. 11a to 11d further show diameter vs. frequency characteristics of same in accordance with an embodiment described herein.
Figure 11B:
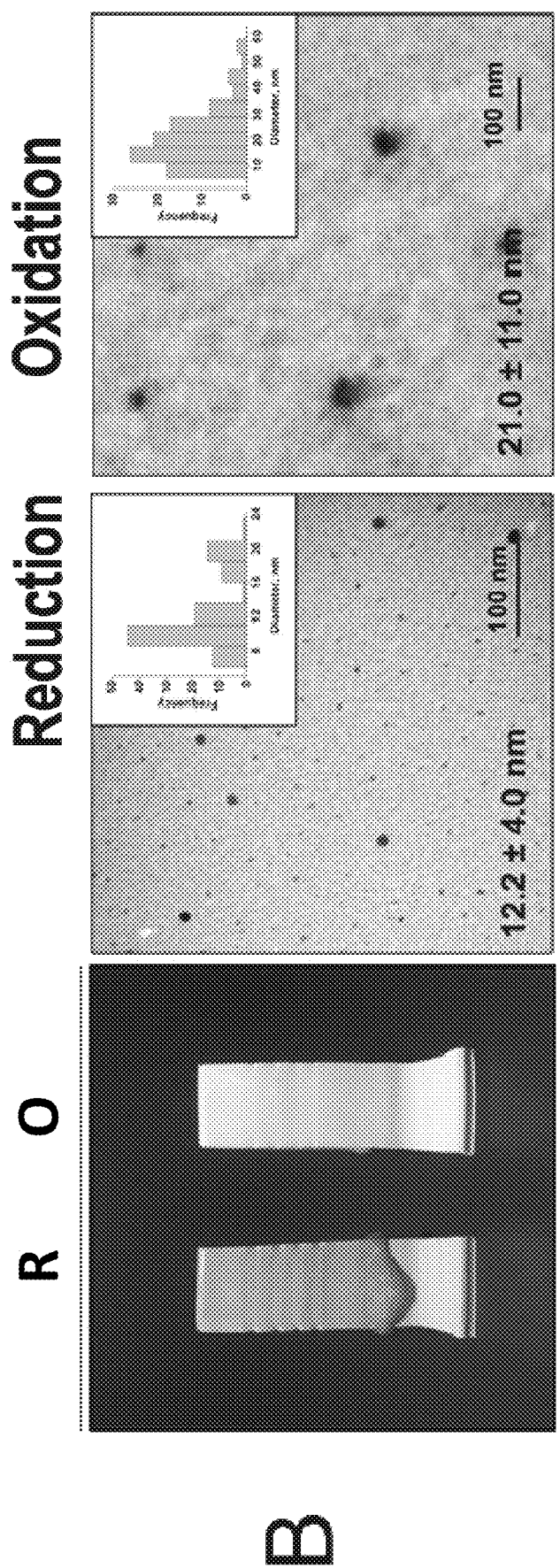
Figure 11C:
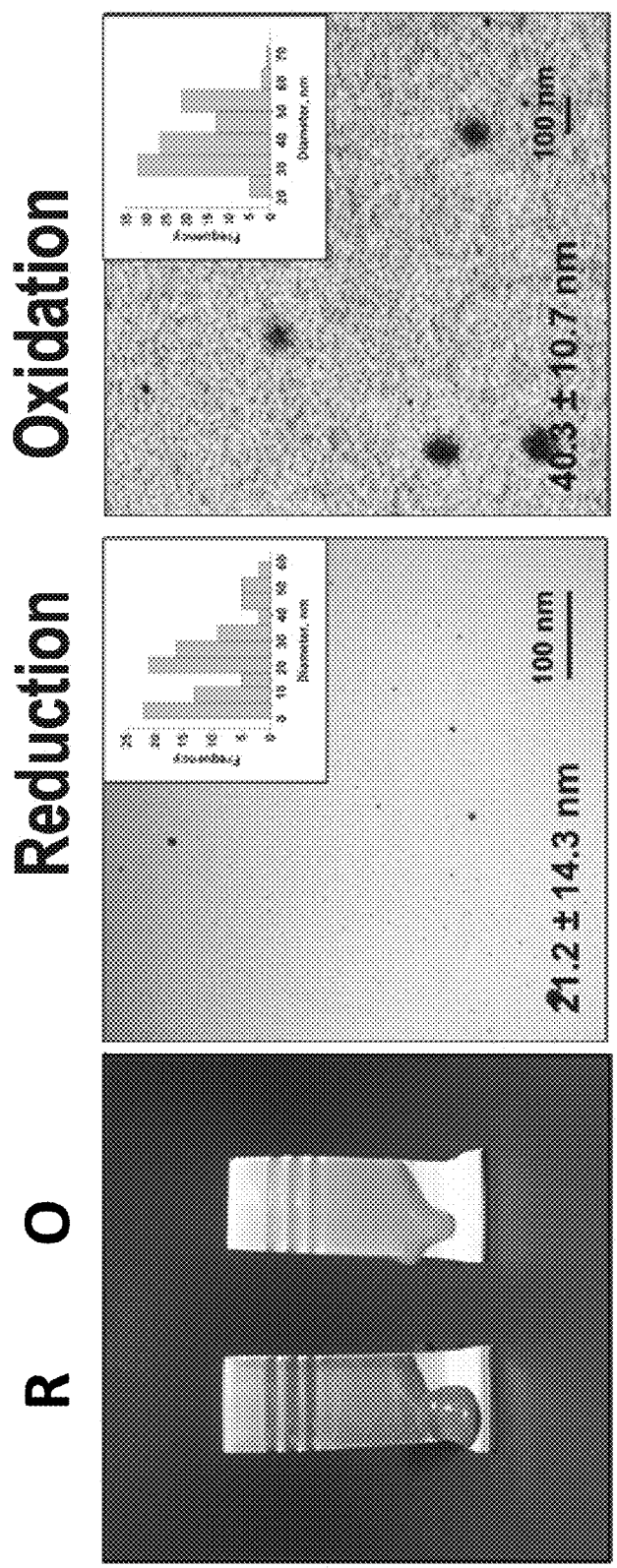
Figure 11D:
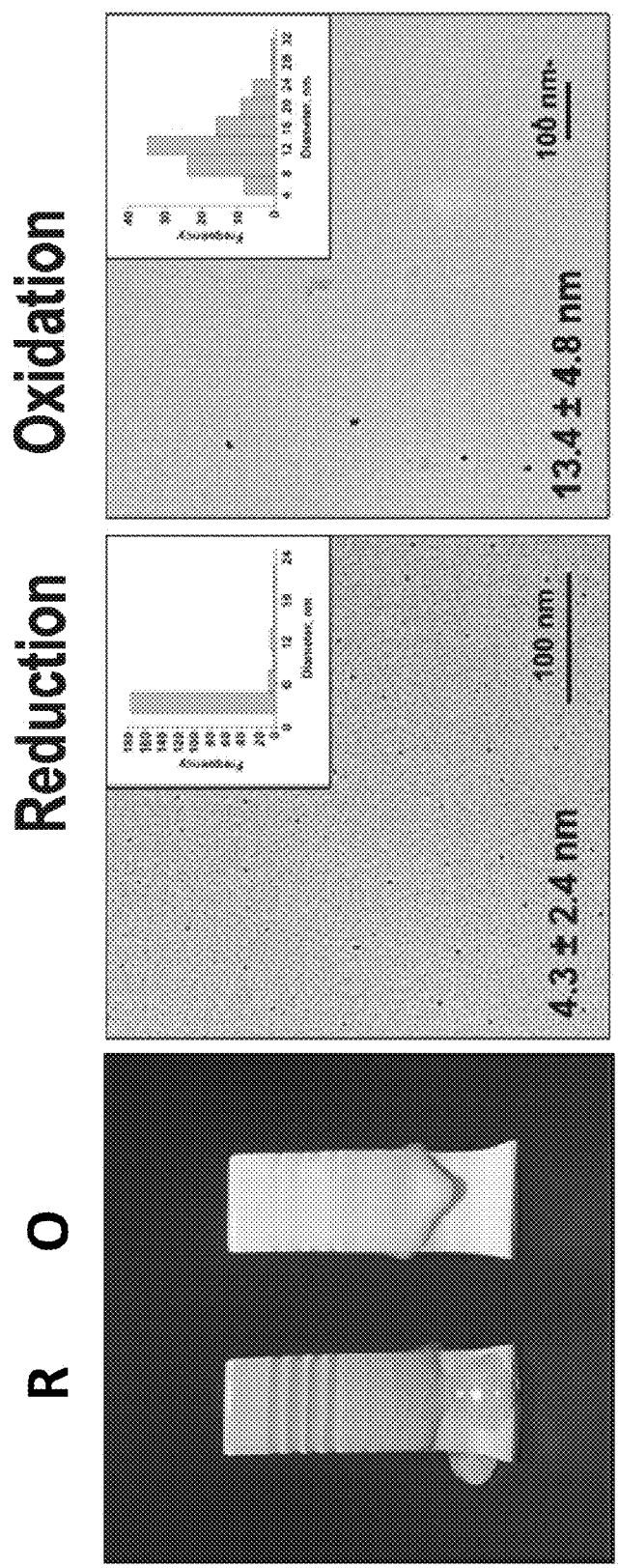

After firing, glazes from the fired samples were prepared and imaged using TEM. FIG. 10a shows gold nanoparticle aggregate (Au NP Agg). FIG. 10b shows Ag NP with particle size distribution graph overlaid for 20 nm silver nanoparticles. Referring to FIGS. 11a-11d, the reduction-fired $HAuCl_4$ glaze (FIG. 11a, R) is a dark red-purple color that was comparable to that first synthesized and imaged in FIGS. 3a-3c (R), 4a-4c (R) and 7a-7c (R), suggesting the presence of Au NPs. The oxidized sample (FIG. 11a, O) also has a similar color profile to FIGS. 3a-3c (O), 4a-4c (O) and 7a-7c (O). The reduced $AgNO_3$ glaze (FIG. 11b (R)) resulted in a burnt laurel green glaze. The oxidized $AgNO_3$ sample (FIG. 11b (O)) resulted in a very light white-green color. Reduced Au Agg (FIG. 11c (R)) produced a light red-brown color, and the oxidized sample (FIG. 11c (O)) produced an orange glaze. Reduced Ag NP (FIG. 11d (R)) produced a light jade color, while the oxidized sample (FIG. 11d (O)) produced almost no color. For all eight samples, there is nanoparticle formation as seen in FIGS. 11a-d and for all four glazes from different metal precursors, the oxidized samples (O) yielded nanoparticles that were significantly larger than their respective reduced sample (R) equivalent. Both free Au NPs and aggregated Au NPs were observed in the reduced sample of Au agg. For the oxidized Ag NP sample, 200 NPs were measured instead because a small percentage of particles were so large that the standard deviation was greater than the average particle diameter.

Reflectance spectra measurements were also taken. The color profiles are shown in the reflectance spectra graphs in FIGS. 12a-12d, wherein FIG. 12a shows reflectance spectra for $HAuCl_4$ glaze, FIG. 12b shows reflectance spectra for $AgNO_3$ glaze, FIG. 12c shows reflectance spectra for Au Agg glaze and FIG. 12d shows reflectance spectra for Ag NP glaze. Higher percent reflectance corresponds to more pale colors. Lower percent reflectance corresponds to a darker, more vibrant color. And the relationship between number of nanoparticles in the glaze with reflectance and this color vibrance can be described as follows: as the number of nanoparticles increases within a glaze profile, the color becomes deeper and results in a lower percent reflectance and as the percent reflectance increases, the glaze color becomes paler and less vibrant.

Figure 13:
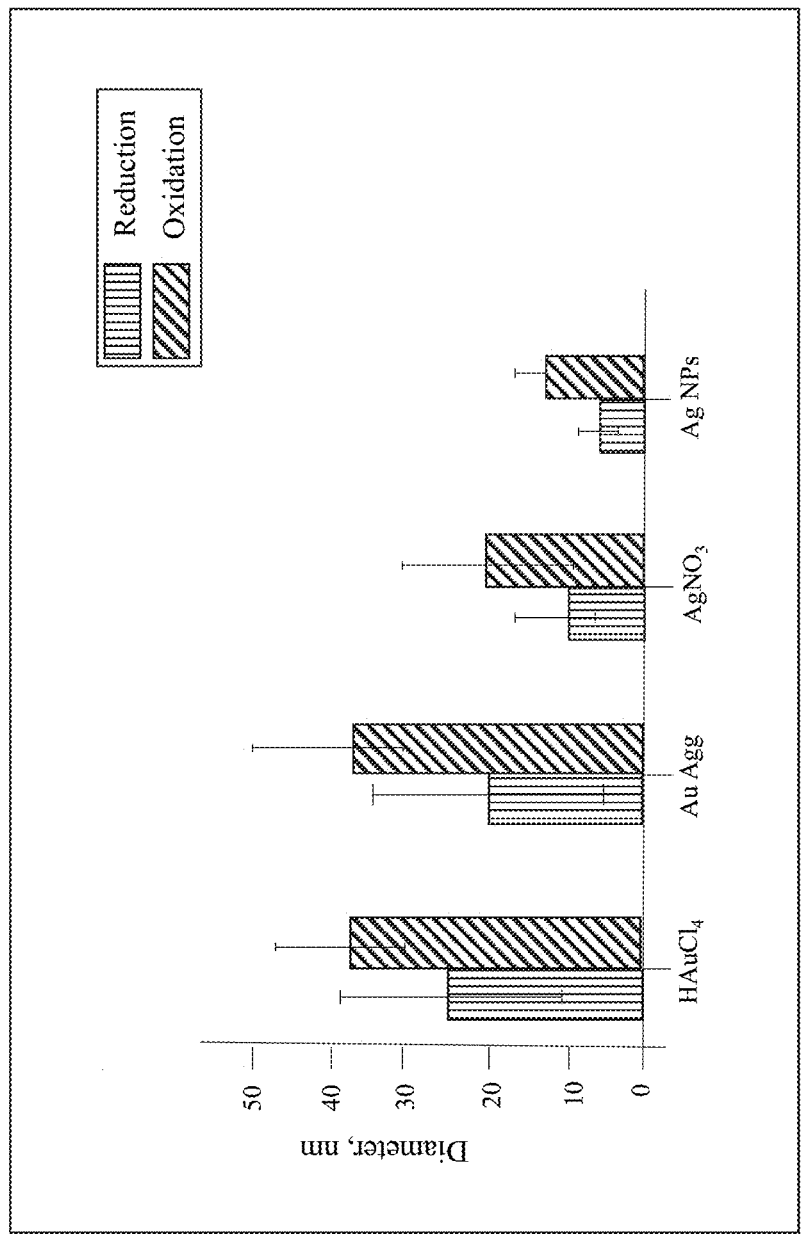
FIG. 13 shows oxidation vs. reduction firing diameter characteristics for various glazes in accordance with an embodiment described herein.

For reference, a more complete graphing of average NP diameters for each of the eight glazes is shown in FIG. 13.

In additional embodiments, varying colors have been achieved using the more efficient processes described herein using Au—Ag alloy nanoparticle-suspension ceramic glazes from metal salt blends, including the unintentional incorporation of Al in these alloys to supplement plasmon band color and intensity. By way of example only, the six (6) Au—Ag alloy ratio combinations shown in Table 2 were prepared and fired.

|  | % Au | $HAuCl_4$ (mg) | $AgNO_3$ (mg) |
| --- | --- | --- | --- |
| Glaze 1 | 100 | 38.39 | 0 |
| Glaze 2 | 80 | 38.39 | 8.7 |
| Glaze 3 | 60 | 38.39 | 11.5 |
| Glaze 4 | 40 | 38.39 | 51.7 |
| Glaze 5 | 20 | 38.39 | 137.9 |
| Glaze 6 | 0 | 0 | 500 |

Figure 14B:
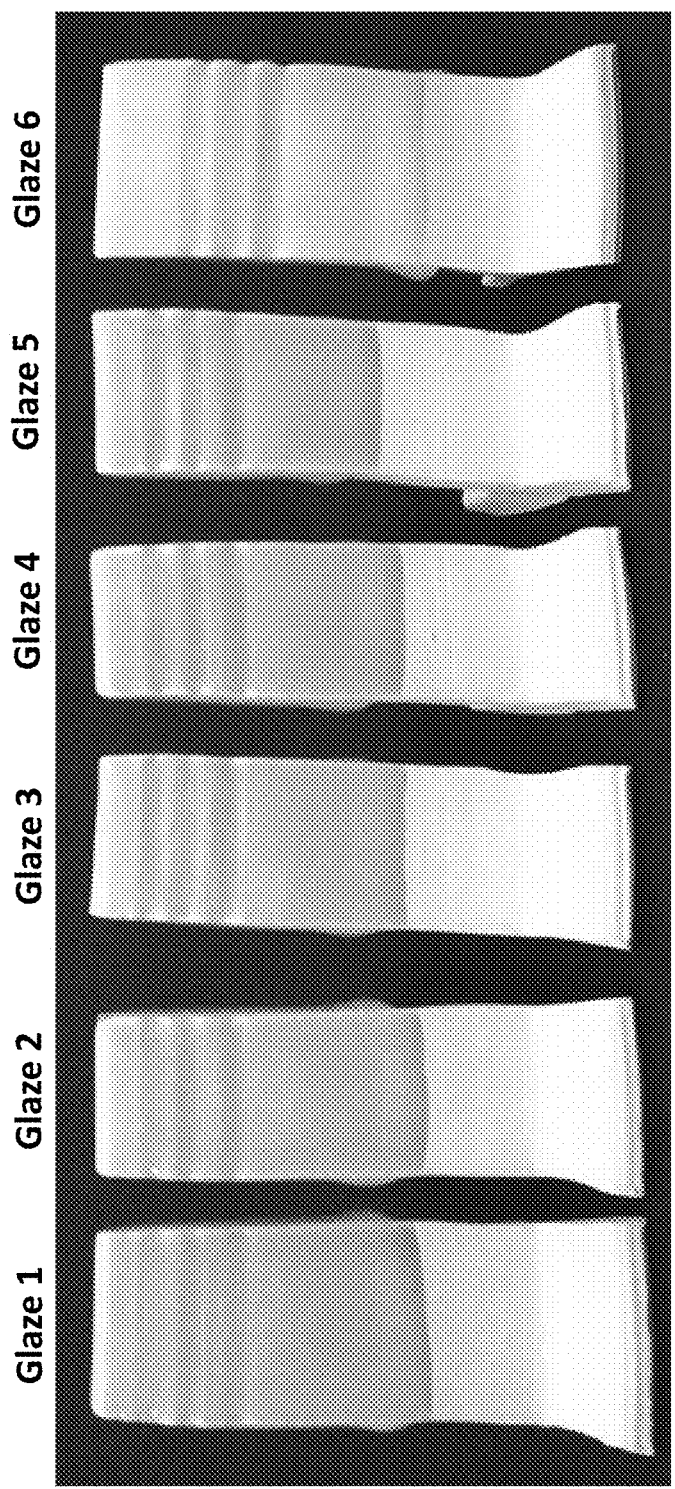

One skilled in the art recognizes that these formulations are merely exemplary. FIGS. 14a and 14b show the colors for each glaze post-firing in reduction (FIG. 14a) and oxidation (FIG. 14b) kilns.

Accordingly, the embodiments herein describe sintering-induced formation of nanoparticles within reductive and oxidative kilns to produce a wide variety of colors. Directly adding the metal salts $HAuCl_4$ or $AgNO_3$ to glazes allows for the formation of gold and silver nanoparticles during both reductive and oxidative firing processes. Gold aggregate is also observed to degrade and renucleate into new Au NPs alongside aggregated materials, resulting in color. Each of these allows for comparable color profiles to traditional red glazes and previously reported new Au NPs glazes by recycling nanoparticle synthesis waste. Further methods with the use of noble metal salts may be used in modern glaze formulations for natural nucleation and growth, resulting in low metal loading plasmon resonance coloring. These methods bypass preliminary nanoparticle synthesis that require atypical acids, solvents, heat, precision, and specialized equipment. Furthermore, the low metal levels and relative bio-inertness of gold and silver lowers the risk of contaminating food, drinks, or soil with toxic metals and reduces the impact of mining on the environment.

The embodiments described herein represent a potential new standard for low metal loading glazes, in which these systems require significantly lower metal than the traditional 5-12% metal loading glazes currently in use. With this decrease in colorant consumption through nanomaterial plasmon resonance color, a new standard for environmentally conscious ceramic surface development is achieved. Additionally, this lower use of materials for color formation results in lowered ecological impact via reduced energy consumption for material mining/processing, lowered materials cost (under 1$ in gold per batch of glaze, which is enough to prepare the surface of any functional ceramic), lowered ecological mining impact, and minimized heavy metal leaching through lower surface presence of colorants.

It is respectfully submitted that one skilled in the art recognizes the various alternative materials, amounts, equipment and the like which, though not explicitly described herein, are well within their knowledge and thus are included within the scope of the embodiments herein.

The invention claimed is:

1. A process for producing a fired glaze containing gold nanoparticles (Au NPs), the process consisting of:
   loading a base dry glaze powder material with a colorant material, the colorant material consisting of an amount of metal nanoparticles, wherein each of the metal nanoparticles is formed of a single element type, and further wherein the amount of metal nanoparticles is formed by loading less than 0.1 percent by weight of an Au NP concentration to produce a loaded glaze, wherein the Au NP concentration consists of citrate-stabilized nanoparticles synthesized from $HAuCl_4$ each nanoparticle having a diameter of less than 100 nm;
   applying the loaded glaze to a component; and
   firing the component in a kiln, wherein the fired glaze on the component contains the Au NPs after firing and the average diameter of the Au NPs after firing is reduced by 50% and is less than 50 nm.

2. The process according to claim 1, wherein the kiln is a reduction kiln.

3. The process according to claim 1, wherein the kiln is an oxidation kiln.

4. The process according to claim 1, further comprising preparing the dry glaze powder material prior to loading including combining by weight 20% G200 feldspar, 20% Ferro Frit 3134, 20% Kaolin EPK, 19% flint/silica, 15% wollastonite, and 6% talc.

5. The process according to claim 4, wherein the dry glaze powder material further includes an opacifier.

6. The process according to claim 5, wherein the opacifier is $SnO_2$.

7. A process for producing a fired glaze containing metal nanoparticles and an observable color, the process consisting of:
   mixing multiple non-colorant materials forming a pre-firing dry glaze powder;
   loading at least one colorant material consisting of the metal nanoparticles at a concentration of less than 0.1 percent of a total weight of the pre-firing dry glaze powder material, wherein the average diameter of the metal nanoparticles is less than 100 nm and further wherein each metal nanoparticle is formed of a single element type; wherein the at least one colorant material is selected from the group consisting of gold nanoparticles and silver nanoparticles;
   applying a pre-firing glaze formed from the pre-firing dry glaze powder and the at least one colorant material to a component; and
   firing the component in a kiln, wherein the fired glaze on the component contains the metal nanoparticles after firing and the average diameter of the metal nanoparticles after firing is reduced by 50%.

8. The process according to claim 7, wherein the observable color is selected from the group consisting of red and green.

* * * * *